United States Patent [19]
Barkan et al.

[11] Patent Number: 6,098,877
[45] Date of Patent: *Aug. 8, 2000

[54] INTERFACE AND METHOD FOR CONTROLLING AN OPTICAL READER HAVING A SCANNING MODULE

[75] Inventors: Ed Barkan, Miller Place, N.Y.; Philip Swift, Lexington, Mass.; Paul Dvorkis, Stony Brook, N.Y.; John Lert, Westport, Conn.; Margaret Hetfield, East Northport; Patrick J. Salatto, Shirley, both of N.Y.

[73] Assignee: Symbol Technologies, Inc., Holtsville, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/861,322

[22] Filed: May 21, 1997

[51] Int. Cl.⁷ .................................................. G06K 19/06
[52] U.S. Cl. .................................. 235/25; 235/22; 235/26
[58] Field of Search .......................... 235/462.2, 462.22, 235/462.23, 462.26, 462.25, 472.01

[56] References Cited

U.S. PATENT DOCUMENTS

| | | |
|---|---|---|
| 3,978,318 | 8/1976 | Romeo et al. ........................ 235/61.11 |
| 4,251,798 | 2/1981 | Swartz et al. ......................... 340/146.3 |
| 4,369,361 | 1/1983 | Swartz et al. ............................ 235/470 |
| 4,387,297 | 6/1983 | Swartz et al. ............................ 235/462 |
| 4,409,470 | 10/1983 | Shepard et al. ......................... 235/472 |
| 4,410,235 | 10/1983 | Klement et al. ........................ 455/612 |
| 4,720,185 | 1/1988 | Kurihara ................................. 350/255 |
| 4,760,248 | 7/1988 | Swartz et al. ............................ 235/472 |
| 4,896,026 | 1/1990 | Krichever et al. ...................... 235/472 |
| 5,202,784 | 4/1993 | Readdersen ............................. 359/196 |
| 5,329,103 | 7/1994 | Rando ................................. 235/462.36 |
| 5,340,970 | 8/1994 | Rockstein et al. .................. 235/462.23 |
| 5,468,951 | 11/1995 | Knowles et al. .................... 235/472.01 |
| 5,528,022 | 6/1996 | Nakazawa ............................... 235/436 |
| 5,578,810 | 11/1996 | Bard et al. ............................... 235/472 |
| 5,610,387 | 3/1997 | Bard et al. ............................... 235/472 |
| 5,786,581 | 7/1998 | Eastman et al. ........................ 235/455 |

OTHER PUBLICATIONS

SE 1000 Integration Manual, Revision C, Apr. 1994, Symbol Technologies, Inc., p. 5, p. 38.

*Primary Examiner*—Donald Hajec
*Assistant Examiner*—Diane I. Lee
*Attorney, Agent, or Firm*—Kirschstein et al.

[57] ABSTRACT

An electrical interface for a scan engine includes a plurality of control pins including a range limiter mode pin, laser enable and scan enable pins, a signal output pin and a start-of scan indicator pin. Operation of the scan engine can thus be controlled to reduce power consumption and laser on-time as desired.

10 Claims, 18 Drawing Sheets

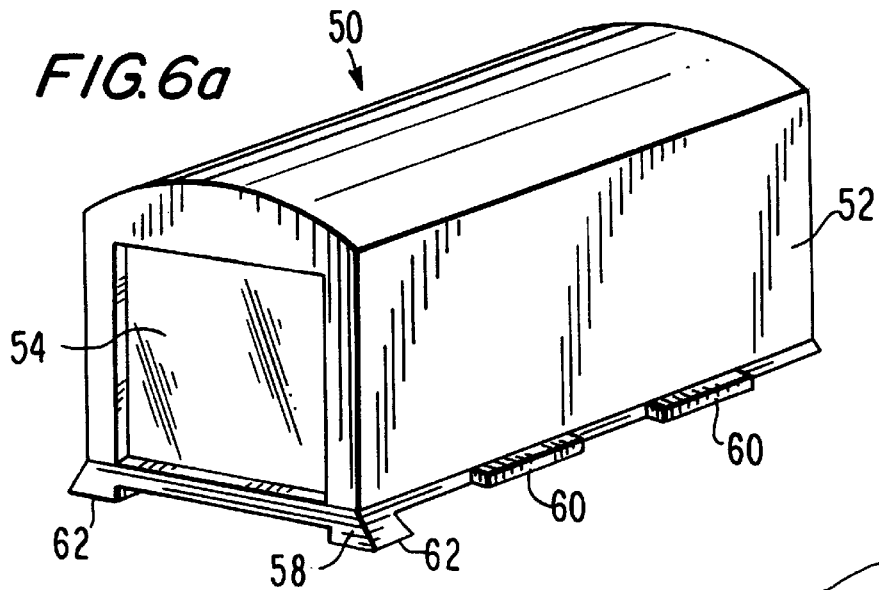
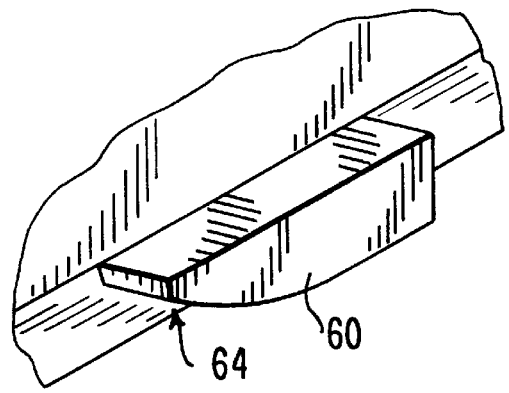
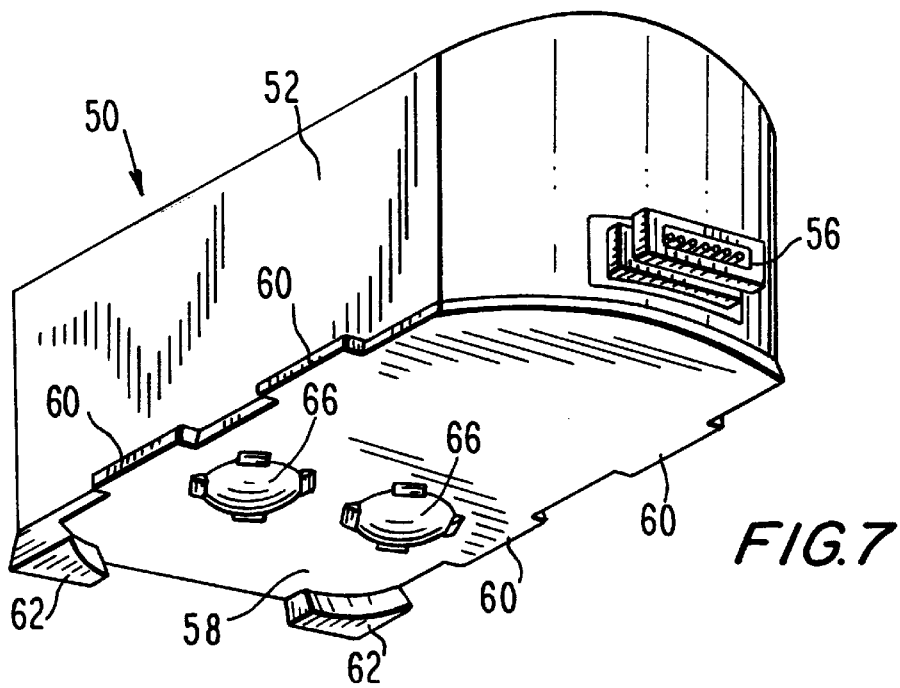

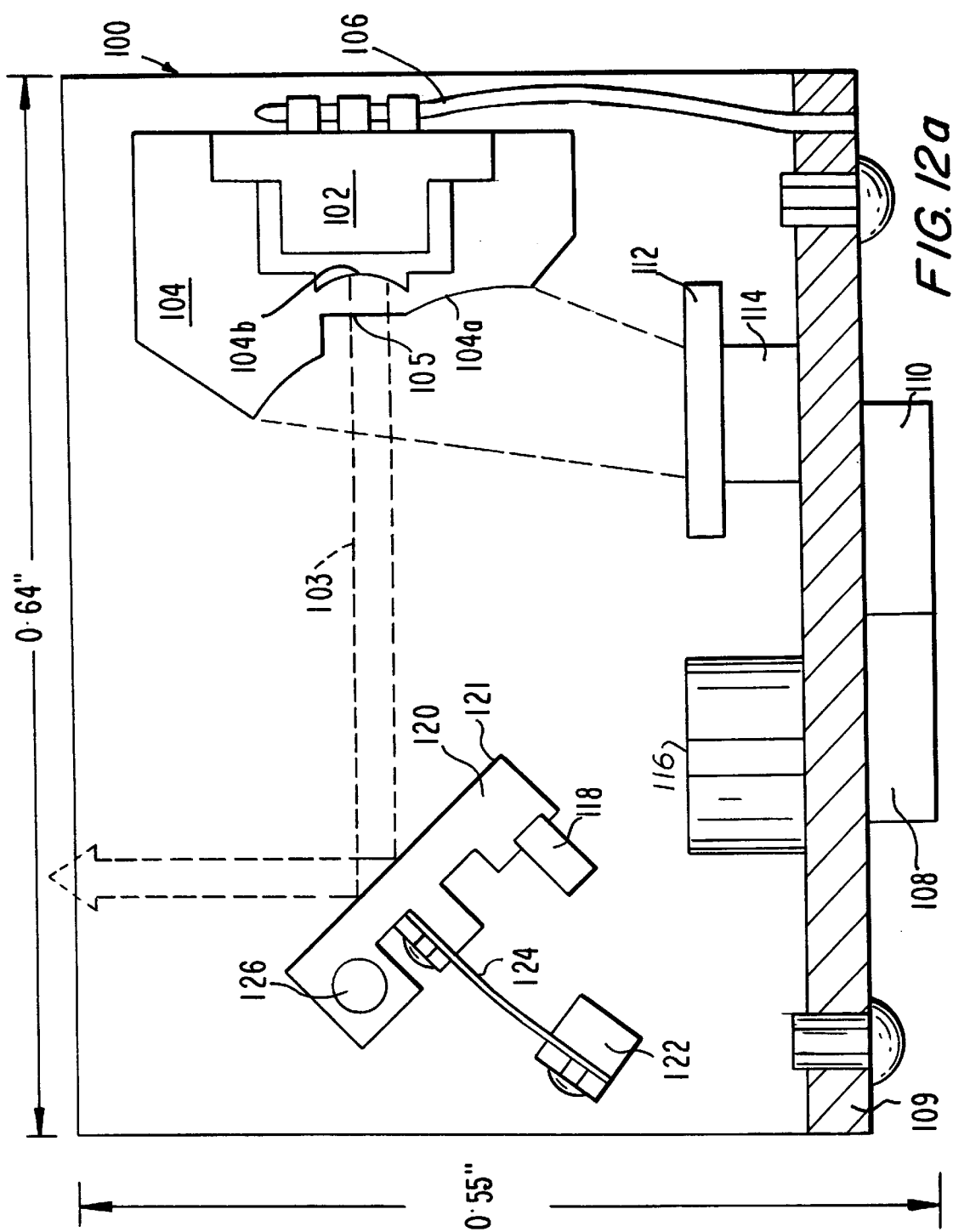

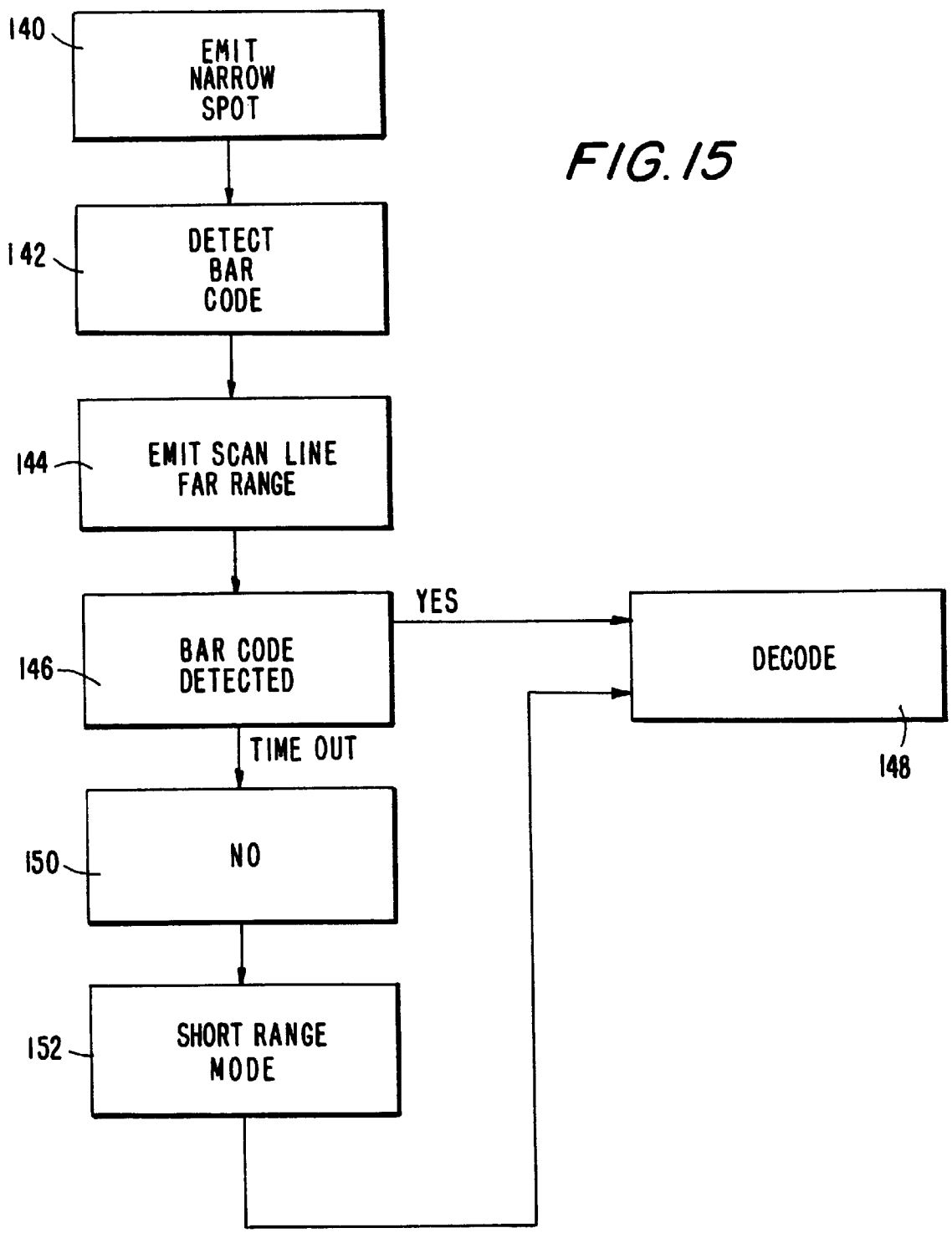

INTERFACE AND METHOD FOR CONTROLLING AN OPTICAL READER HAVING A SCANNING MODULE

REFERENCE TO RELATED APPLICATIONS

This application is related to U.S. patent application Ser. No. 08/381,515, filed Feb. 1, 1995, and U.S. patent application Ser. No. 08/895,888, filed Jul. 17, 1997.

BACKGROUND OF THE INVENTION

1. Field of the Invention

The invention relates to interfaces for example between optical readers and related components and to finger mounted optical readers, for example ring scanners.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; and 4,409,470; 4,760,248; 4,896,026, all of which have been assigned to the present applicant. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

However in some cases it is undesirable to have to grip the scanner in one hand as this reduces the user's maneuverability and capability to use both hands to lift objects and so forth. At the same time it is not desired to lose a particular advantage of a handheld scanner that it can be pointed in a desired direction.

Various solutions have been proposed to overcome these problems, in particular providing a finger mounted scanner. Whilst existing systems have met with success, it is nonetheless desirable to improve systems yet further, in particular in terms of their adaptability, flexibility and processing and scanning power. One known scanner is described in U.S. Pat. No. 5,578,810, commonly assigned herewith and incorporated herein by reference.

U.S. Pat. No. 3,978,318 relates to a scanner mounted on an inverted T extension, the stem of the extension being received between two of the user's fingers when the base rests on the user's palm. The system therefore requires that the user grips the extension tightly at all times which is inconvenient and uncomfortable.

In another aspect it is desired to improve the performance of interfaces between scanners and associated components. In particular, at present, many scanners cannot discern between bar code symbols and accidental surface patterns resembling bar code symbols, for example wood grain, dirt or texture on the base of a console holding the scanner. This is a particular problem where the scanner is not manually triggered but is permanently operative.

It is a general object of the present invention at least to alleviate some of the problems associated with the prior art. It is a further object to provide a ring scanner having improved adaptability.

It is a further object of the present invention to provide a scanner having reduced probability of accidentally reading surface patterns resembling bar code symbols.

SUMMARY OF THE INVENTION

According to the invention there is provided an interface system for operation of an optical reading module by a control module via an interface, the reading module including a reading beam generator and a reading beam detector, the control module including an operation controller and a decoder and the interface having a plurality of interface points for control of parameters of operation of the generator by the control module. Control of the components can thus be achieved via independent pins, allowing improved operation. In all relevant aspects of the invention a reader or scanner can be a field of view optical reader or a flying spot optical scanner including a reading beam scanner.

The scanning module preferably further comprises a gain controller for controlling the gain of an output signal from the scanning beam detector to a signal output interface point to the decoder wherein the operation controller is arranged to set an interface point to the gain controller to either of a limited range or full range setting. As a result full reading is only enabled (full range setting) when a valid code is detected. The operation controller preferably sets the interface point to the limited range setting in the default condition and in which the operation controller sets the interface point to the full range setting if the decoder receives a valid bar code output signal from the detector.

The operation controller may set the interface point to the laser beam generator to either of an enabled or disabled setting. The controller may set the interface point to the scanning beam scanner to either of an enabled or disabled setting. The operation controller may set the interface point to the scanning beam scanner to either of an enabled or disabled setting, and preferably the interface point to the scanning beam generator is only set to enabled when the interface point to the scanner is set to enabled. As a result reduced power consumption is achieved. The operation controller may set the interface point to the scanning beam scanner to either of an enabled or disabled setting, and preferably when the scanner is set to enable the laser is set to enabled only on selected scans, and in which the laser is set to continuous enabled when the decoder reads a valid decode signal from the detector or the scanning beam scanner may be set to continuous enabled and the scanning beam generator enabled for selected portions only of each scan. Once again power consumption can be reduced until a valid decode is present.

The scanning beam scanner may change the setting of a scanner state interface point at the start of each scan.

The operation controller may set the interface point to the scanning beam scanner to continuous enabled. Thus when the laser is enabled reading can commence immediately.

According to the invention there is provided a scanner interface for interfacing between a scanner component and a control component, the interface comprising a plurality of dedicated interface points for controlling operation of a respective one or more of the group comprising: a scanning beam generator in the scanner component, a scanning beam scanner in the scanning component, an automatic gain controller in the scanner, a decoder in the control component, a processor in the control component and a method of controlling operation of a scanner, the scanner comprising a scanning beam generator, a scanning beam scanner and a detector, wherein parameters of operation of the scanning beam generator and/or scanning beam scanner are controlled by external control means via an interface, control signals being issued to the scanner and/or generator via respective dedicated interface points on the interface. The scanner may further comprise an automatic gain controller for controlling the gain of the detected signal, the external control setting the gain to limited range in a default setting to full range when a valid signal is detected by a control signal issued via a dedicated interface point on the interface. The external control may set the scanning beam generator to enable only on selected scans unless a valid signal is detected by the detector. The external control may enable the scanning beam generator only during a portion of each scan unless a valid signal is detected by the detector.

According to the invention there is provided a portable scanner comprising a mount portion and a scanner portion, wherein the mount portion is configured to be secured to the finger of a user and includes a base and opposing limbs defining a scanner recess and the scanner portion is releasably attachable to the mount portion in the scanner recess. The scanner is thus conveniently portable and pointable, and can be recovered with minimal difficulty if required.

The scanner portion may be reversibly releasably attachable to the mount portion. The system thus accommodates left and right handed use. The scanner portion preferably comprises a housing having a scanning end and the mount portion is preferably generally open at opposing ends allowing reversible attachment of the scanner portion with the scanning end unobstructed. The system thus operates equally well in either configuration.

The scanner portion may be slidably mountable on the mount portion. Detent means may be provided on the mount portion for releasably retaining the scanner portion in position on the mount portion. The scanner is thus strong and secure.

An aperture may be provided in the base of the mount portion allowing escape of moisture and/or vapour. Even if the user perspires this does not affect operation.

The mount portion may include a manual scanner actuator for cooperation with a scanner actuating switch provided on the scanner portion. The manual actuator and cooperating switch may be situated centrally on the mount portion and scanner portion respectively allowing actuation in either of the reversible attaching positions. A minimum number of components are thus required for both configurations.

The mount portion may be configured to be secured to two adjacent fingers of a user via a flexible strap for extra support.

According to the invention there is provided a reader for reading printed indicia comprising a mount portion and a reader portion releasably attachable thereto, wherein the mount portion includes means for securing the mount portion to two adjacent fingers of a user for additional support, a reader for reading printed indicia comprising a support and a scanner, the support being mountable on a user's finger and the scanner being reversibly releasably attachable thereto and a scanner system comprising a scanner sub-assembly and a control assembly wherein the control assembly is mountable on a user's wrist and the scanner sub-assembly is mountable on a user's finger, the control assembly and scanner sub-assembly communicating via a physical interface, allowing a minimum of components to be provided with attendant weight reduction at the user's finger, and a ring scanner including a ring portion mountable on a user's finger and a scanner portion releasably attachable to the ring portion wherein the ring portion includes an aperture at a region adjacent, in use, the user's finger allowing moisture and/or vapour to escape.

According to the invention there is further provided a reader comprising a scanning beam generator, a scanning beam scanner and a scanning beam detector for detecting a scanned beam reflected by an item to be read further comprising an optical element integrally formed to include scanning beam generator locating means, a first optical component for directing the generated scanning beam at the scanner and a second optical component for directing the reflected scanned beam onto the detector. The multi-functional optical element reduces component complexity, number and weight.

Preferably the scanning beam generator, scanning beam scanner, detector and optical element are formed on a single component rendering the system yet simpler and lighter.

Preferably the reader further includes a control component and a scanner drive component, in which the detector, the control component and the drive component are formed on a common circuit board, rendering the system yet cheaper and lighter. The scanning beam scanner may comprise a reflector coupled to a reflector mount via a flexible coupling. The scanner may be scanningly driven by electromagnetic interaction between a drive element provided on the reflector and a drive element fixed relative to the reflector mount. The flexible coupling may comprise a leaf element resiliently deformable transverse to its axis. The arrangement is thus simple, light and long lived.

Preferably the scanning beam generator is powered via a mounting board, and the mounting board is secured to the optical element so as to locate the scanning beam generator relative to the optical element, simplifying construction and securing the laser in place.

According to the present invention there is provided a ring scanner for mounting on a user's finger comprising a scanning beam generator, a scanning beam scanner and a scanning beam detector wherein an optical element is provided for locating the scanning beam generator, directing the generated scanning beam onto the scanning beam scanner and directing the scanned beam reflected by an item to be scanned onto the detector, the optical element comprising a single unitary component and a ring scanner comprising a scanner portion and a ring portion for mounting on a user's finger, the scanner portion including a scanning beam generating means, a scanning beam reflector means and a scanning beam detecting means, wherein the generating, reflector and detecting means are provided on a common substrate, for example a scanner or a chip.

According to the invention there is provided a communications headset comprising a support for mounting on the user's head, and mounted on the support an ear piece and an eye piece, wherein the eye piece carries a visual display for the user. The eye piece may be pivotable into and out of the user's line of sight. A microphone may be mounted on the support, in which the image displayed on the eye piece is controlled by user instructions to the microphone. Wireless communication means may be provided for communication with a remote host, and/or antenna means for cooperating with a global positioning system to determine the position of a user. A multifunctional, hands-free communications system is thus provided.

According to the invention there is provided a method of scanning machine readable indicia by a reader including a scanning beam generator, a scanning beam scanner, a scanning beam detector and a signal decoder in which, in a first, locating mode, the scanning beam scanner is disabled and a narrow beam is issued by the scanner, and in which a second detection mode is entered when the decoder identifies a valid indicia, the scanning beam scanner is enabled and the reader issues a scanning line. Power is thus saved and possible misreads are avoided.

Preferably the detection mode comprises an initial detection mode in which the scanner is set to one of long range or short range detection and, if no valid code is decoded then a subsequent detection mode is entered in which the scanner switches to the other of long range and short range detection mode. As a result automatic range selection is achieved.

The scanner may include a first long range scanning beam generating means and a second short range scanning beam generating means between which it switches in the initial and subsequent detection modes or a first, long range optical component and a second, short range optical component for cooperation with a scanning beam generator between which the scanner switches in the initial and subsequent detection modes.

The scanner may include user actuation means actuable between a first, narrow beam actuating position and a second, scanning line actuating position.

According to the invention there is provided a reader for reading indicia comprising a scanning beam generator, a scanning beam scanner and a scanning beam detector in which the reader is switchable between a long range scanning mode and a short range scanning mode, wherein control information selecting the mode is represented as printed indicia and the scanner is arranged to scan the printed indicia and switch to the selected mode accordingly. Simple and efficient mode selection is thus achieved.

The reader may include a first, long range scanning beam generator and a second, short range scanning beam generator or a first, long range optical system cooperable with the scanning beam generator and a second, short range optical system cooperable with the scanning beam generator, and means for introducing one or other system into cooperation with the scanning beam generator according to the mode selected.

According to the invention there is provided a method of selecting short range or long range scanning mode for a reader in which control information for selecting the mode is represented as printed indicia and the reader switches to a selected mode when the corresponding indicia is read.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 6a is a perspective view of a scanner module from the present invention;

FIG. 6b is a view of a detail of the scanner module of FIG. 6a;

FIG. 7 is a perspective view of a scanner module according to the present invention from the underside;

FIG. 12a shows the internal components of a miniaturised scanner;

FIG. 12b shows a schematic diagram showing the mounting of the scanner of FIG. 12a;

FIG. 15 is a flow chart showing near range/long range operation of a scanner;

DESCRIPTION OF THE PREFERRED EMBODIMENT

Throughout the specification, where appropriate, references to a scanner or reader can be interpreted equally as references to a flying spot optical scanner or field of view optical reader.

Figure 1:
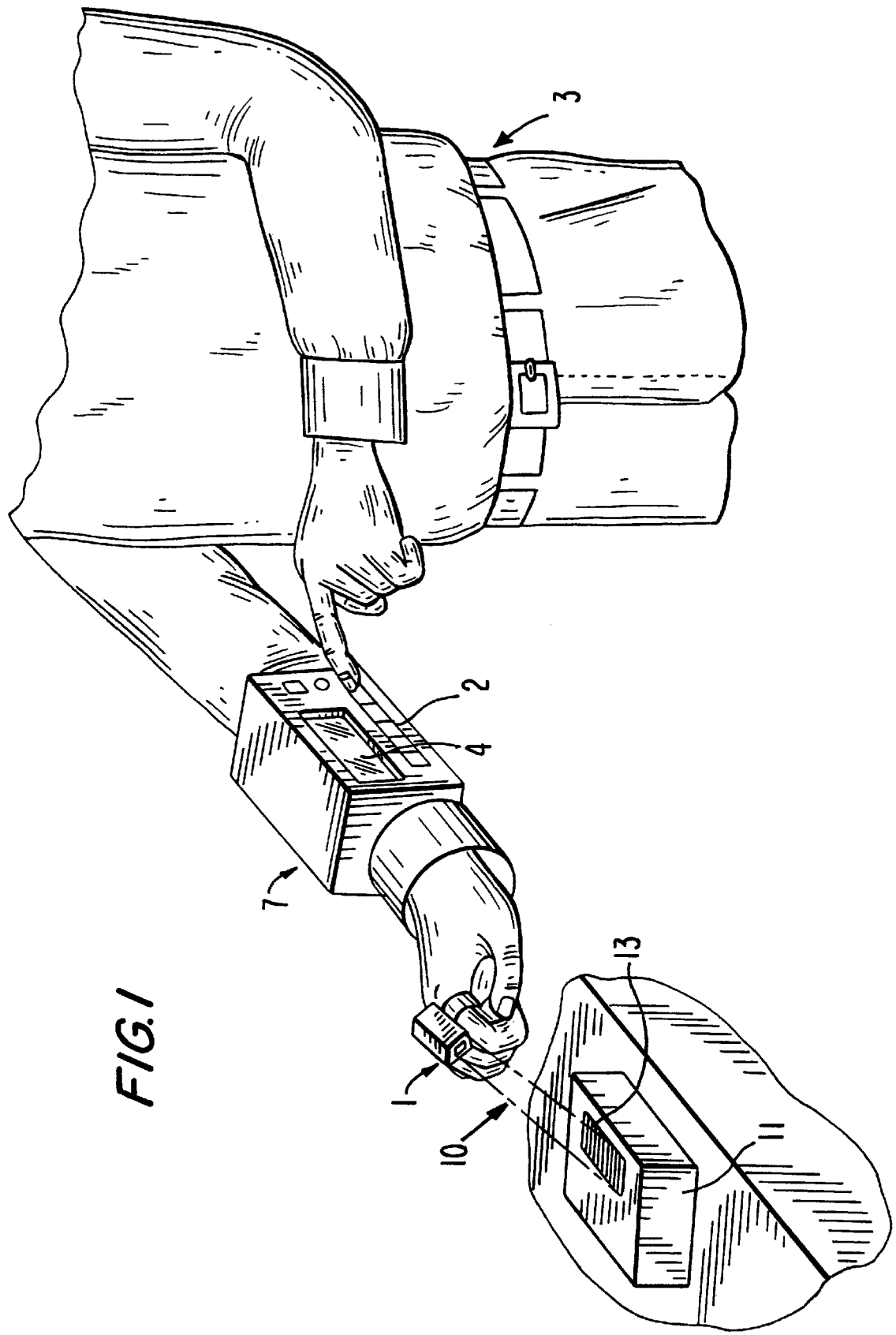
FIG. 1 shows schematically operation of a scanner according to the present invention.

FIG. 1 shows a ring scanner system in accordance with the present invention. An optical scan module in the form of a ring scanner 1 is detachably mounted on a single finger of a user 3 using a ring-shaped mounting.

In additional to the optical scan module 1, the user 3 wears a peripheral module 7, on the wrist. As will be clear from the FIG. 1, the scan module 1 emits a scanning laser beam 10 which the user directs towards a bar code symbol 13 to be read. The bar code symbol may be printed on or otherwise attached to on article 11, details of which the user 3 wishes to obtain for example for inventory or for sale purposes. The scanning beam 10 is reflected from the bar code symbol 13, and the reflected light 12 is detected by the scan module 1.

Figure 2:
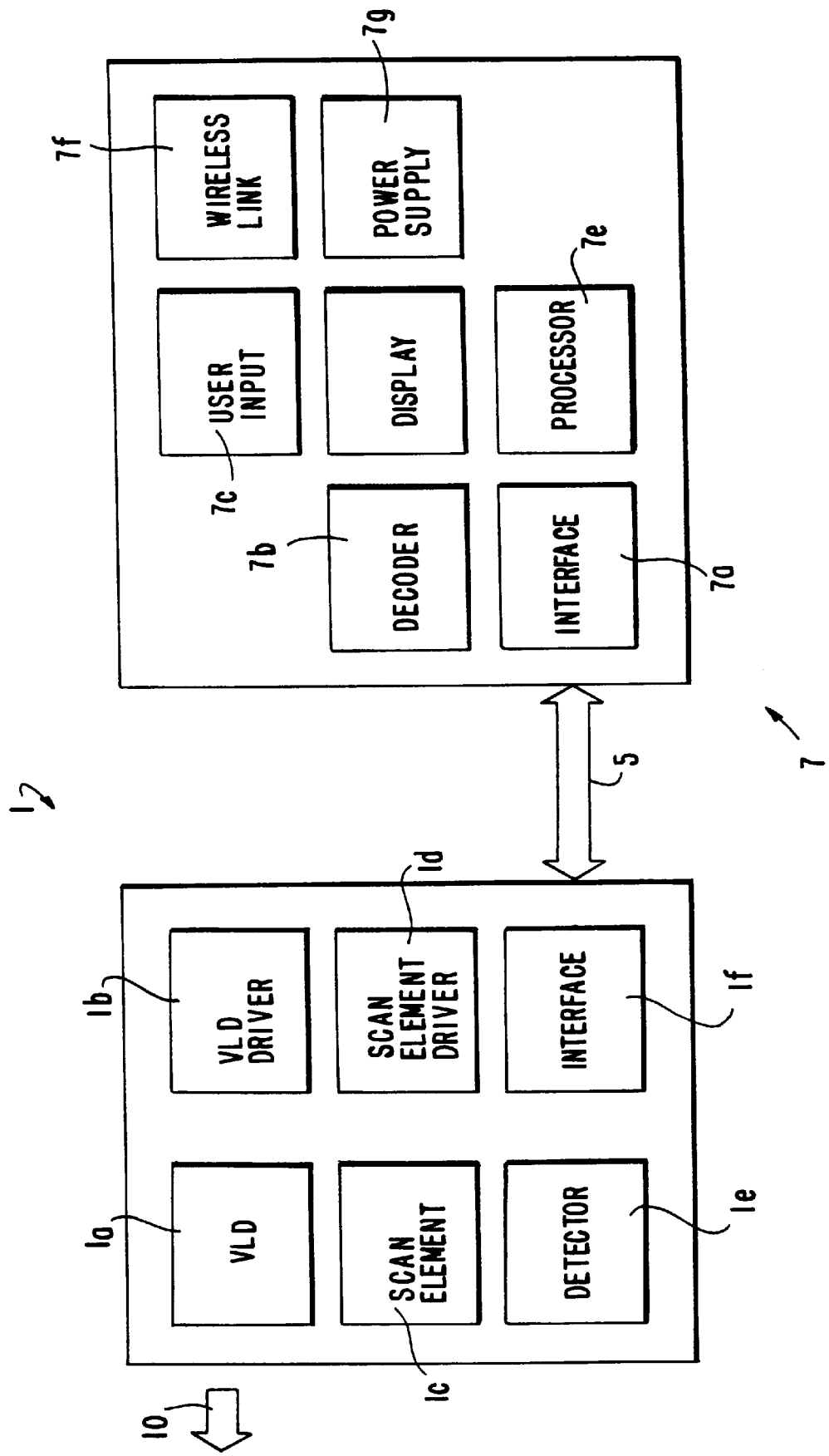
FIG. 2 is a block diagram showing the basic components of a scanner according to the present invention.
Figure 3:
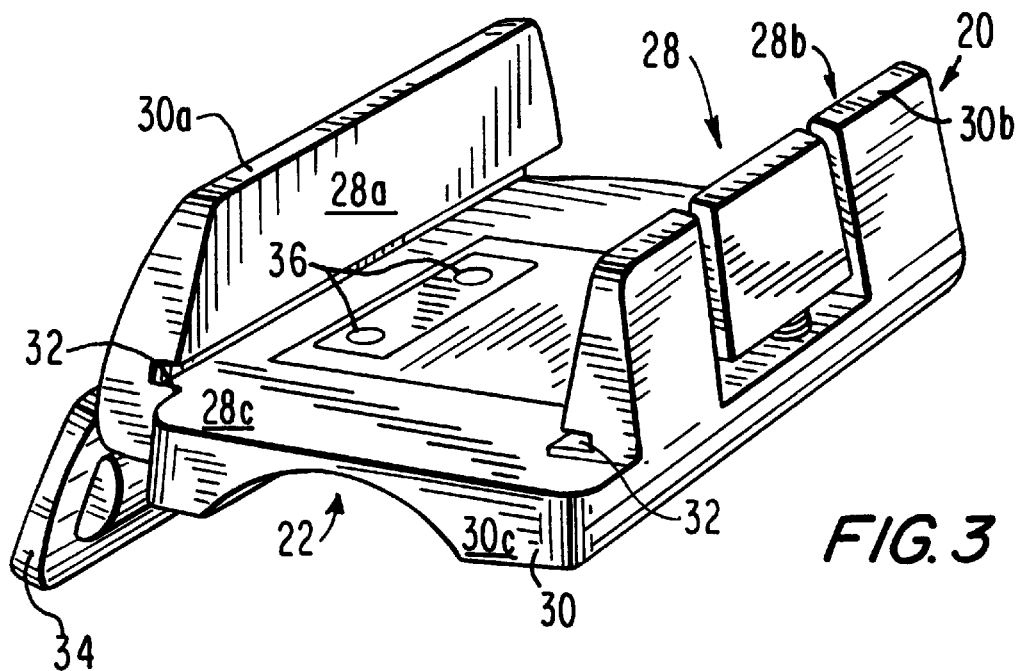
FIG. 3 is a perspective view of a scanner mount according to the present invention.
Figure 4:
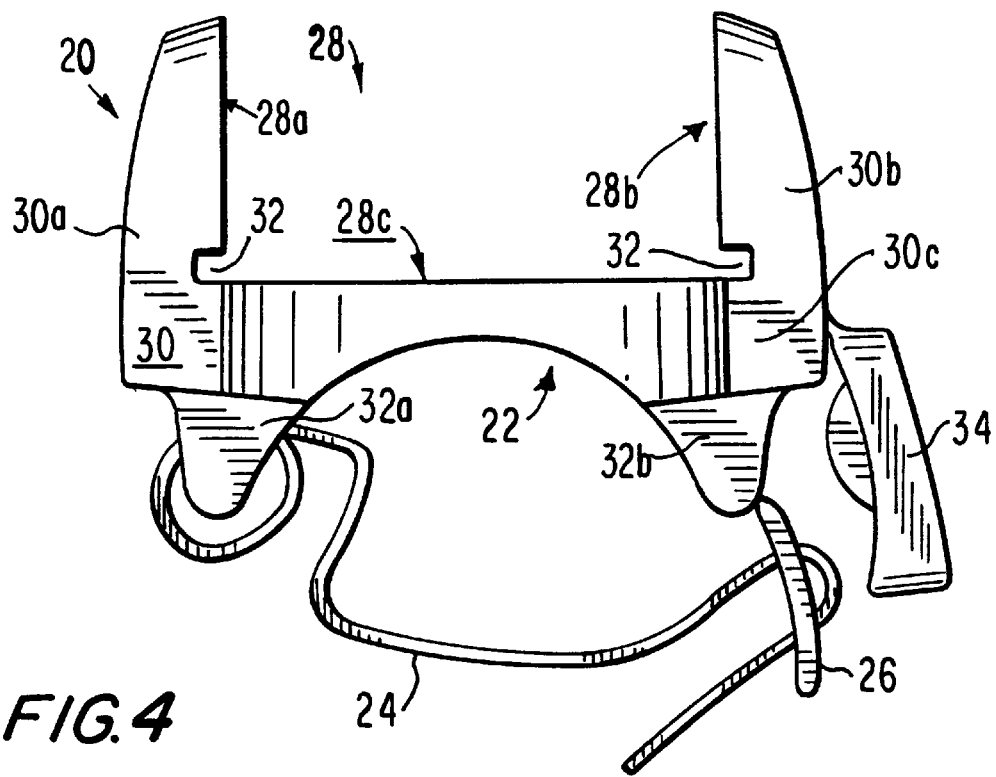
FIG. 4 is an end view of a scanner mount according to the present invention.

FIG. 2 illustrates schematically the internal features of the scan module 1 and the peripheral module 7. The module 1 incorporates a device for generating and scanning the light beam 10, desirably a visible laser diode (VLD) 1a, having a driver 1b. Scanning of the beam 10 is achieved by means of a scan element 1c and a scan element driver 1d.

The ring scanner 1 further incorporates a detector 1e for detecting the light beam 10 reflected by a bar code symbol and an interface 1f for communication via cable means with the peripheral wrist mounted module 7. The wrist mounted module 7 includes an interface 7a for communication with the ring scanner 1, a decoder 7b for decoding all information received from the ring scanner 1, a user input for allowing the user 3 to enter control and/or other relevant information via, for example, the keyboard 2 as shown in FIG. 1, or other user input 7c. The module 7 further includes a display 7d for displaying status, control or other relevant information to the user, (shown as 4 in FIG. 1). A processor 7e controls the various components and the interaction and communication between them. The module 7 further includes a wireless link 7f arranged to communicate with a host or access point to a host control computer by wireless communication such as RF, IRDA, microwave or any other suitable known systems. The module 7 further includes a power supply 7g arranged to power both the module 7 and, by the wired link 5 between the interfaces of the two components, the ring scanner 1.

It should be noted that the scan element 1c and scan driver 1d can be omitted from the ring scanner 1 to reduce weight yet further and allow a fixed beam/field of view implementation, wherein the detector comprises a CCD.

It will be seen that the system allows hands free scanning wherein, mounted on the user's arm, a scanner and integrated computer and radio are all provided. These components combine to form a fully developed system which is both adaptable and highly efficient. The system can be operated whilst the user's hands remain free for handling packages, products, materials and so forth. Such a system is of particular benefit in, for example, warehouse picking, package distribution and receiving/shipping.

The ring scanner is discussed in more detail below, but in brief it includes miniaturized components restricted to the vital scanning and data transfer elements such that the ring scanner weight and size is minimized and it mounts comfortably and easily on a user's finger. The data processing and memory power are held at the wrist unit which connects with the ring scanner via a cable link. The wrist module or wrist unit preferably combines a CPU, display, keyboard, battery pack and suitable radio card, for example the Spectrum One (trade mark) radio card allowing radio communication with a remote host, and hence full mobility.

The components of the system are discussed in more detail with reference to FIGS. 3 to 10. The ring scanner comprises two basic elements, a mount 20 and a scanner 50. The mount includes a curved, finger receiving recess 22 the length of its bottom face and further includes a strap 24 (shown in FIG. 4 but otherwise omitted for purposes of clarity) which is adjustable using a buckle of any known type for example as shown at 26 in FIG. 4. The mount 20 includes a scanner receiving recess 28 running in a scanning direction and the finger recess 22 extends the length of the mount 20 in the scanning direction. The user inserts his or her finger in the strap 24 such that it rests against the finger recess 22, and tightens the strap 24 using buckle 26 to a desired tension such that the axis of the mount running along the scanning direction is also parallel to the pointing direction of the finger. It will be seen that the mount can be considered to comprise a main body 30 and extension portions 32a, 32b (FIG. 4) extending below the main body and either side of the finger recess 22. The extension portions 32a, 32b follow the contour of the finger recess (which cuts into the main body 30 slightly) so as to improve the grip of the mount 20 on the user's finger, and discourage slipping of the mount 20 around the finger. In addition the extension portions 32a, 32b provide an anchor for the strap 24 and buckle 26 respectively.

The scanner recess 28 is approximately square and U-shaped in cross-section and comprises two vertical opposing surfaces 28a, 28b joined by a substantially flat horizontal surface 28c. Opposing vertical surfaces 28a, 28b comprise the inwardly facing surfaces of two upwardly projecting limbs 30a, 30b of main body 30. The limbs 30a, 30b are joined by a horizontal base portion 30c of the main body 30, and the outwardly facing surface 28c comprises the upper face of horizontal portion 30c.

The scanner recess 28 is open at each end (viewed in the scanning direction) and is shaped to receive the scanner 50 as a snug, sliding fit. Horizontal channels are provided in each of the vertical limbs 30a, 30b of a main body 30, running in the scanning direction and acting as guides for corresponding projections on the scanner 50 (discussed below).

The mount 20 further includes a drainage slot 37 (FIG. 10) running in the scanning direction through base portion 30c. In the variant shown, the slot 37 is provided adjacent the vertical limb 30b, centrally with respect to the transverse axis and of dimension roughly half the length of the vertical limb.

Turning to the scanner 50, as shown in FIGS. 6a, 6b and 7 in particular, it will be seen that the scanner includes an elongate substantially cuboid body 52 having at one end a scanning window 54 and at the other end an interface socket 56. The scanning direction runs transverse to the scanning window 54 parallel to the long axis of the main body 52. The scanner 50 includes a plate-like base portion 58 including projections extending transverse to the scanning direction and stops 62 provided at the front, window end of the scanner 50, projecting downwardly from each front corner of the base portion 58.

Figure 8:
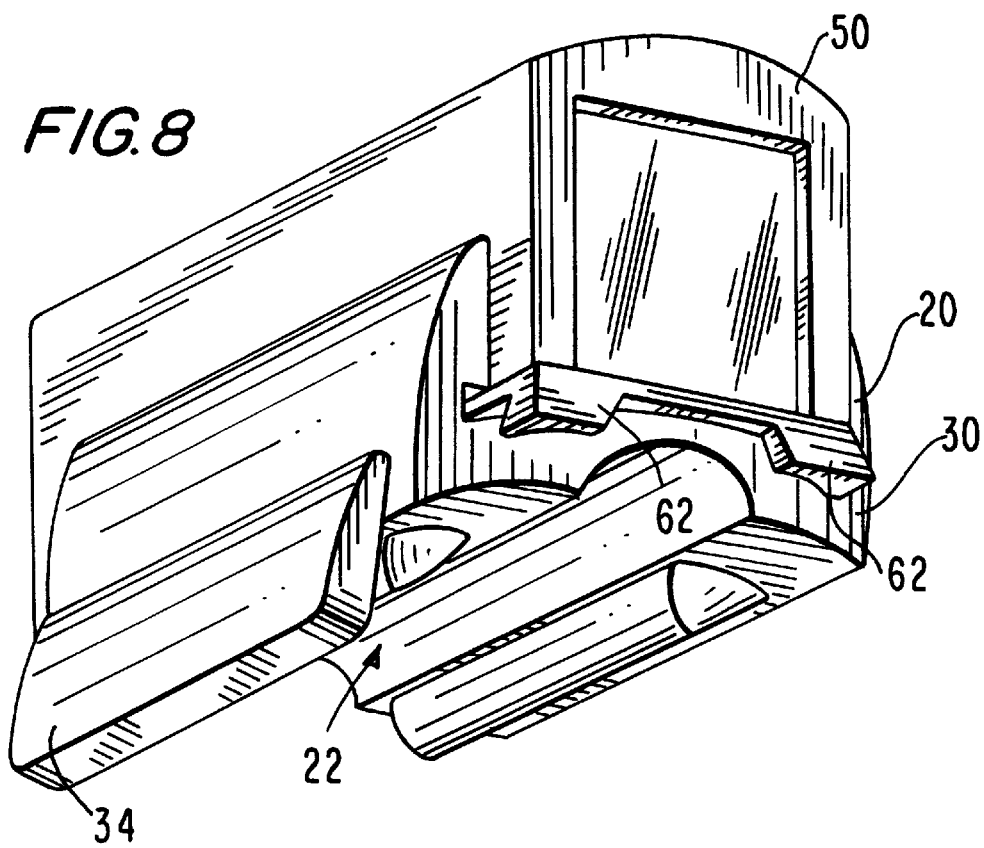
FIG. 8 is a perspective view showing the scanner module in place in a scanner mount according to the present invention.

The scanner 50 and mount 20 are assembled as shown in FIG. 8. The rear end of the scanner 50 is slid into one end of the mount 20 until the stops 62 abut the front face of the main body 30 of the mount 20. The projections 60 on the base portion 58 of the scanner 50 engage in the channels 32 on the mount, guiding the scanner and ensuring that it is securely held transverse to the scanning direction on the mount 20. The stops 62 prevent backward movement of the scanner parallel to the scanning direction.

Figure 5:
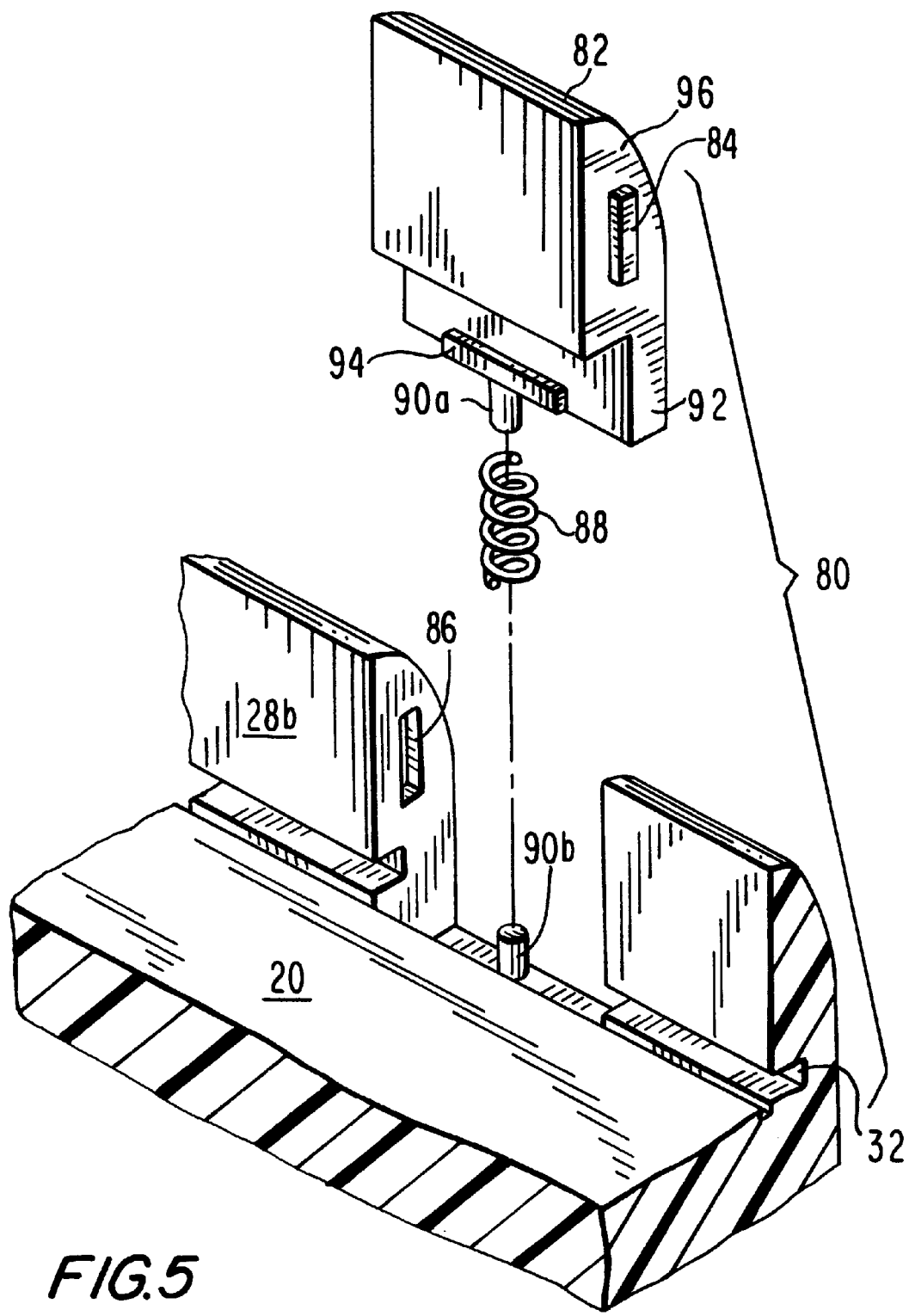
FIG. 5 is an exploded cross-sectional view of a detail of the scanner mount of FIGS. 3 and 4.

In order to hold the scanner 50 yet more securely in place a detent system designated generally 80, and shown in FIG. 5 is provided on the mount 20. The detent system 80 is provided in a central, cut away portion of one of the upwardly extending limbs 28a, 28b—in the present case limb 28b is selected. The cut away portion comprises a square or rectangular gap in the wall of limb 28b extending below the level of bottom portion 30c. In this gap there is provided a catch 82 vertically slidably mounted as discussed in more detail below, but generally constrained to move within the gap. The catch 82 is preferably profiled in cross-section transverse to the scanning direction to match the cross-sectional profile of the limb 28b.

The catch 82 includes a projection 84 either side in the scanning direction cooperating with a recess 86 in each opposing face of the limb 28b. Movement of the catch relative to the mount 20 is guided and constrained by the cooperation of the projection 84 and recess 86. A spring or other resilient biasing means 88 is provided between the catch 82 and the mount 20, held in place by vertical posts 90a, 90b on the catch 82 and mount 20 respectively and resiliently biasing the catch 82 vertically upwardly relative to the mount 20. The projection 84 and slot 86 are configured such that, in its rest position, the top of the catch 82 is exactly aligned with the top of the limb 28b.

The catch 82 includes a reduced lower portion 92 forming an extension of the slot or channel 32 in the limb 28b. A detent 94 projects inwardly from the reduced portion 92 and is positioned such that, when the catch 82 is in its rest position, the detent 94 obstructs the slot 32. Furthermore the detent 94 is positioned such that, when the catch 82 is in the rest position and the scanner 50 is mounted on the mount 30, the detent 94 sits centrally between the projection 60 on the base portion 58 of the scanner 50. The ends of the detent 94 in the scanning direction abut the opposing ends of the projections 60 in this position. Accordingly, when the scanner 50 is slid into position on the mount 20 it is held securely and stably in position in the scanning direction by the detent 94.

When it is desired to release the scanner 50, the catch 82 is manually depressed downwardly against the bias of spring 88. The detent 94 moves out of alignment with projections 60 and descends below the level of the slot. The reduced portion 92 of the catch 82 extends far enough vertically such that when the catch 82 is fully depressed the slot 32 is continuous and un-obstructed by the upper portion 96 of the catch 82. Accordingly the scanner can be freely slid out of the mount.

FIG. 6b shows an enlarged view of a projection 60 from which it can be seen that the end of the projection 60 nearest the end of the scanner 50 has a camming face 64. As a result it is not necessary to depress the catch 82 when the scanner 50 is slid onto the mount 20 as the camming surface 64 of the projection 60 engages, and pushes downwardly the detent 94. When the projection 60 has moved passed the detent 94 the catch 82 springs up to its return, rest position with the detent 94 positioned once more between the projections 60.

Accordingly the scanner 50 can be easily and quickly removed from the mount 20, and reattached just as quickly and easily. This allows ease of maintenance and interchangeability. In addition it may be desired to remove the scanner portion without the trouble of removing the mount from the user's finger when the user reaches into a physically restricted area. Furthermore, as discussed in more detail below, this configuration allows the user to use the system irrespective of whether the user is left or right handed, without requiring any additional components or modifications.

Referring once again to FIGS. 3, 4 and 10 it will be seen that the mount 20 is generally symmetrical about a vertical plane along the scanning direction. The only functional feature disturbing the symmetry is thumb trigger 34. The trigger 34 is provided along one side of the main body 30 of the scanner 20, running in the scanning direction, and positioned at a suitable height such that it can be operated by the user's thumb when the scanner and mount are mounted on the user's forefinger.

Figure 9:
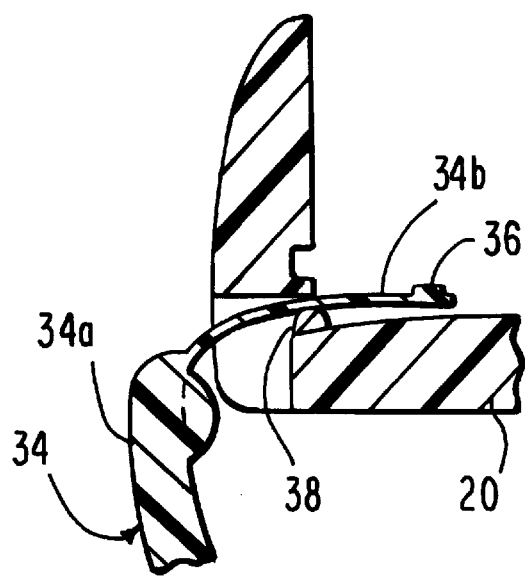
FIG. 9 is a cross sectional view of a detail of the scanner mount according to the present invention.
Figure 10:
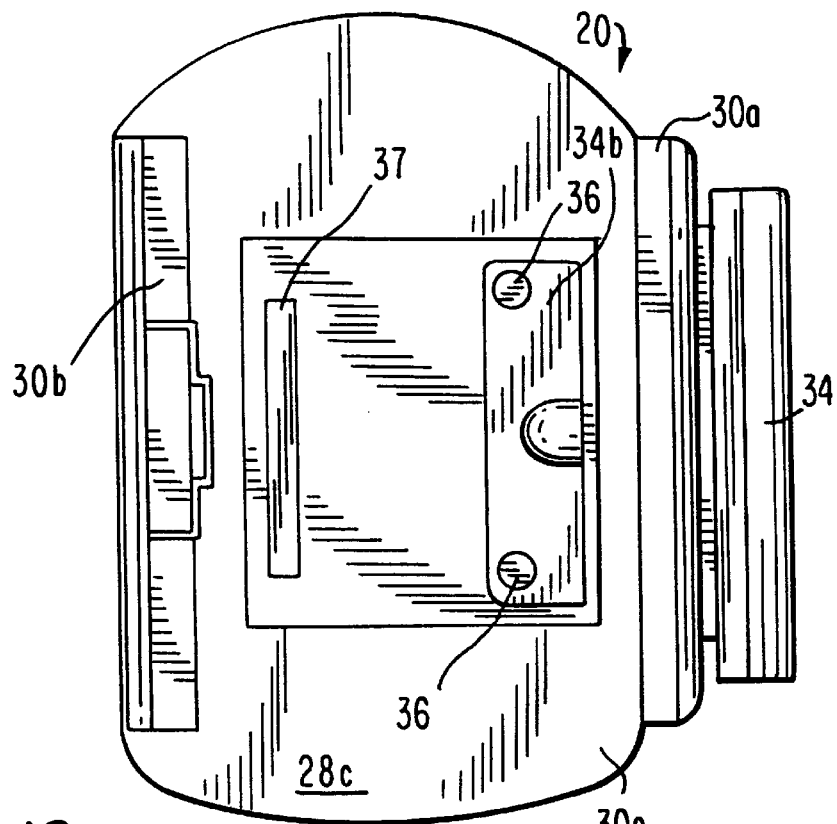
FIG. 10 is a plan view of a scanner mount according to the present invention.

Operation of the trigger 34 is best understood with reference to the sectional view taken along a vertical plane transverse to the scanning direction and through the middle of the trigger 34 in FIG. 9. The trigger 34 comprises a thumb contacting portion 34a and an actuating portion 34b. Thumb contacting portion 34a can be for example of plastics material and the actuating portion 34b can be, for example, a thin strip of metal carrying, at its distal end, a contact 36. The trigger 34 is pivotally mounted about an axle 38 such that when the thumb contacting portion 34a is pushed towards the mount 20 the contacting portion 34b and contact 36 move upwardly. As can be seen from FIG. 7, the scanner 50 includes on its base face a pair of switches 66. The switches are of a known type, each comprising two conducting surfaces spaced from one another, one surface being deformable into contact with the other when a force is exerted, but restoring to its original, non-contacting position when the force is removed. A first of these switches 66 is positioned such that, when the scanner 50 is inserted into the mount facing in a first direction the switch 66 is located above the contact 36. Accordingly when the trigger 34 is actuated the contact 36 applies a force to the switch 66, actuating the switch. When thumb pressure is removed from the trigger 34 the restoring force on the deformable contacting surface of the switch 66 returns the surface to its non-contacting position and also pushes the contact 36 and thus the trigger 34 to its original position. Accordingly the switch 66 provides a resilient biasing force urging the trigger 34 into a non-actuating position.

A particular advantage of the arrangement shown is that, as discussed above, it is suitable for use by left or right handed users. As the mount is substantially symmetrical in the scanning direction and the scanner 20 is entirely symmetrical, this is achieved with the exception of the trigger 34. Of course one possibility would be to provide two triggers 34, one on each side of the mount 20 allowing the user to actuate the trigger with his thumb regardless of whether the mount was carried on the user's left or right hand. However this gives rise to the need for an additional trigger component which will add to the cost and complexity of construction of the arrangement. The solution provided by the present invention is to allow the scanner 50 to be slid onto the mount from both ends of the mount such that one of two opposite scanning directions can be selected. The scanner recess 28 is symmetrical and open at both ends allowing this, and the scanner 50 has stops 62 only at its front end. In addition the scanner has two symmetrically positioned and identical switches 66 such that the scanner 50 is actuated by the trigger 34 regardless of the direction in which the scanner 50 is inserted. In the embodiment shown the switches 66 are mounted near one end (in the scanning direction) of the scanner 50 and as a result a pair of contacts 36 are provided on the mount one adjacent each end. Of course an alternative possibility would be to provide a single perfectly central switch 66 on the scanner and a single corresponding perfectly central contact 36 on the mount 20.

Where the user wears the scanner for a prolonged period of time, one anticipated problem could arise where the user's fingers perspires. In that case, moisture can permeate into the switches 66 which can short-circuit the switches, affecting operation of the scanner. In order to overcome this the drainage slot 37 discussed above is provided. This slot 37 runs through the base 30c of the mount 20 and allows the moisture to escape as well as providing added ventilation. As a result the moisture problem is overcome.

Figure 11:
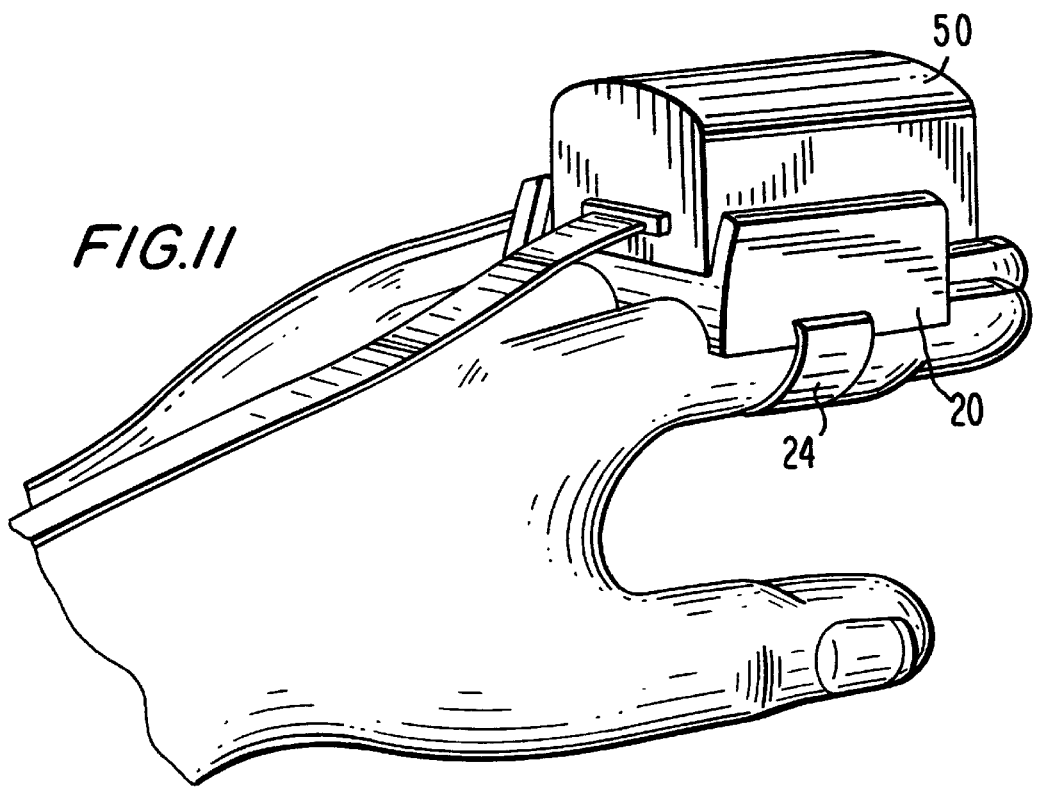
FIG. 11 shows a two-finger mount according to the present invention.

Referring now to FIG. 11, an alternative configuration for the mount 20 and scanner 50 is shown. The mount 20 and scanner 50 interact in the same manner as discussed with reference to FIGS. 3 to 10 although, for clarity, the trigger is not shown. The principal difference, is that, the mount 20 is mounted on two fingers of the user. To achieve this two suitably configured finger receiving recesses are provided on the base of the mount 20 running adjacent each other in a scanning direction. The strap 24 is wrapped around both fingers. As a result the minimal weight of the scanner 50 and mount 20 is distributed over two fingers, rendering the scanner yet easier to hold, aim, manipulate and maintain for the user. It will be appreciated that the mount 20 can be carried on any two adjacent fingers of the user or indeed more than two fingers if desired, with the same advantages. As yet a further alternative, the scanner can be mounted on the user's thumb benefiting from the additional strength of the user's thumb.

Figure 20:
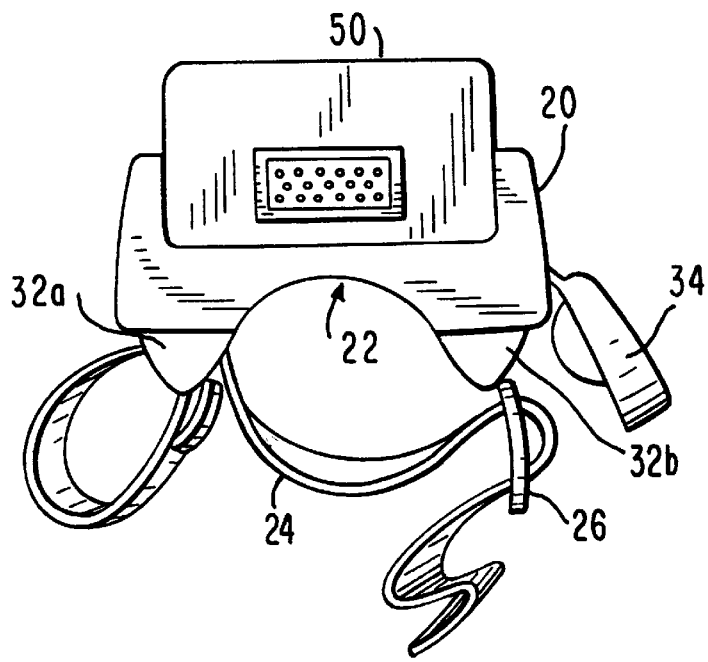
FIG. 20 shows an alternative mounting for the scanner mount of FIG. 3.
Figure 21:
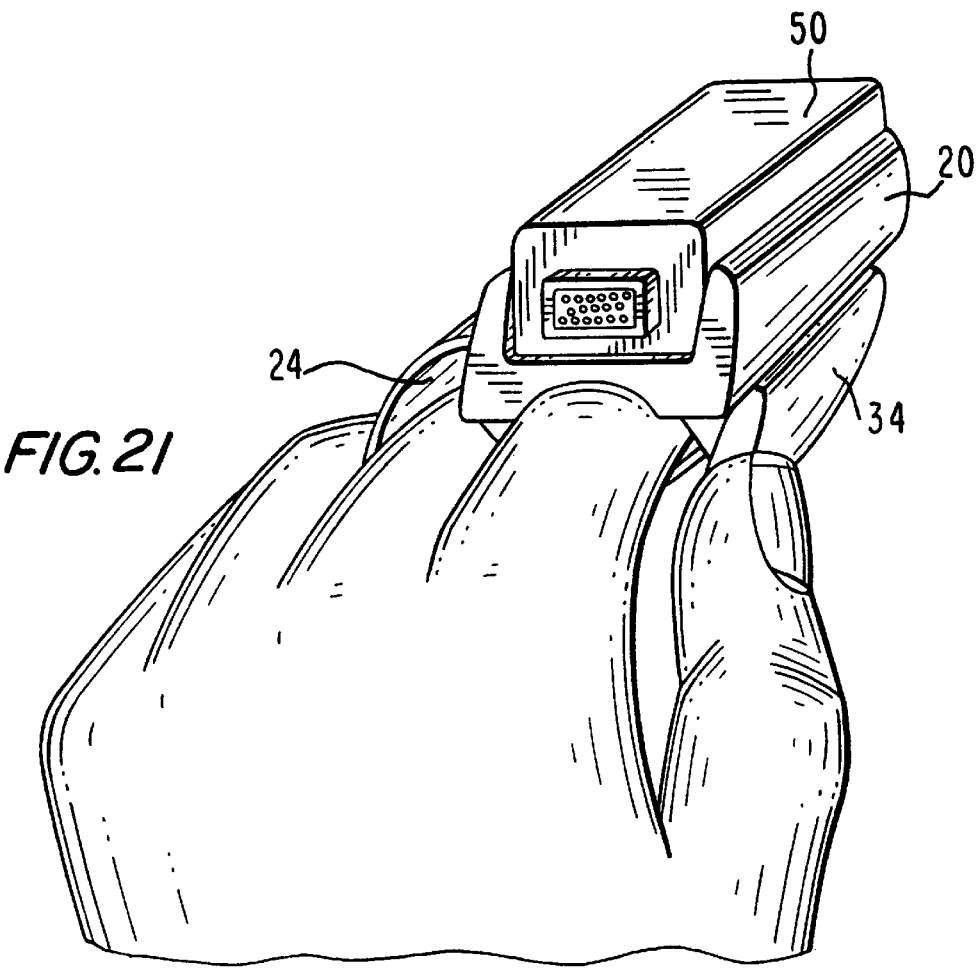
FIG. 21 shows the scanner of FIG. 20 in mounted position.

A further alternative manner of two finger mounting is shown in FIGS. 20 and 21. As discussed in relation to FIG. 4, the strap 24 extends between a buckle 26 and an extension portion 32a forming a first finger receiving aperture in cooperation with the finger recess 22. The strap length can be adjusted using the buckle 26 and the strap is preferably of an elastic nature allowing close and tight fitting around the user's finger. The strap 24 can further be adjusted as shown in FIG. 20. In particular the extension portion 32a includes an eye through which the strap 24 passes and then returns to a fixing point on the extension portion 32a. Accordingly a second loop is formed at the extension portion 32a and this loop can be increased in size by adjusting the length of the strap 24 appropriately. In fact the loop is adjusted such that a second finger can be retained in it. The arrangement is shown mounted on the user's hand in FIG. 21. It will be seen that the user's index finger passes through the aperture formed by the strap 24 and the finger recess 22. The user's middle finger passes through the second loop formed at the extension portion 32a. The strap is adjusted to the desired tightness. As a result the strap is yet more firmly and securely mountable on the user's fingers.

Dependent on the configuration it will be appreciated that the positioning of the trigger would have to be determined accordingly—for example for two finger mounting it is most desirable for the trigger to be positioned so as to be operable by the thumb. Where the two fingers are the middle and index fingers this can easily be achieved following the design of the present invention. For the thumb mounted arrangement the trigger could be provided between the thumb and the index finger allowing operation by the index finger or by a squeezing action between the thumb and index finger.

Other mounting configurations are of course possible—for example the scanner could be mounted on the user's middle finger or indeed any other suitable strong finger on the scanner could be mounted on the back of the hand or top of the wrist although this would lead to less pointing accuracy as a sacrifice for the additional support provided. In addition to enhance user strength the two finger strap could be made long enough to go around the wrist as well providing additional reinforcement. A simple fastening such as Velcro (TM) or other hook fastening material could be used to facilitate fastening. The mount could be formed on a glove or the ring mounted directly on a glove allowing general support for the user.

Aspects of the miniaturization of the scanner will now be discussed in more detail. The features discussed allow additional simplification of the system and a reduction of cost as will be evident from the following description.

Figure 12B:
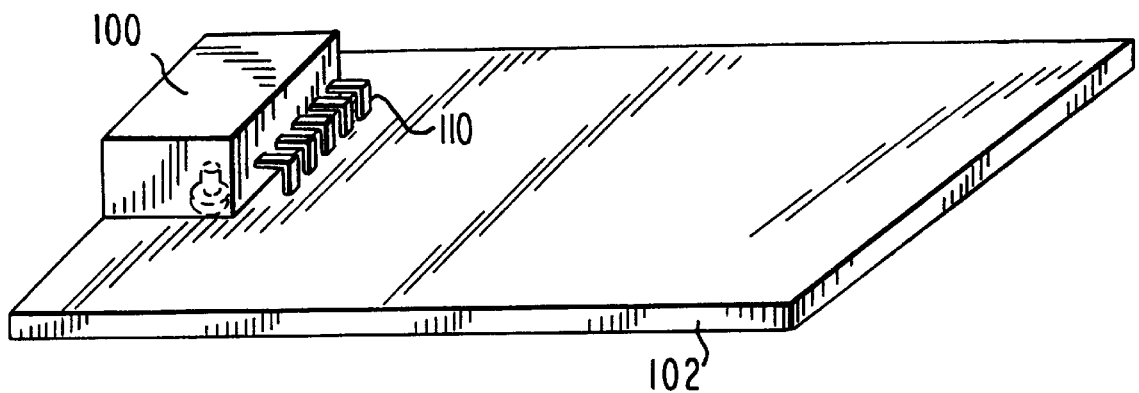
Figure 12C:
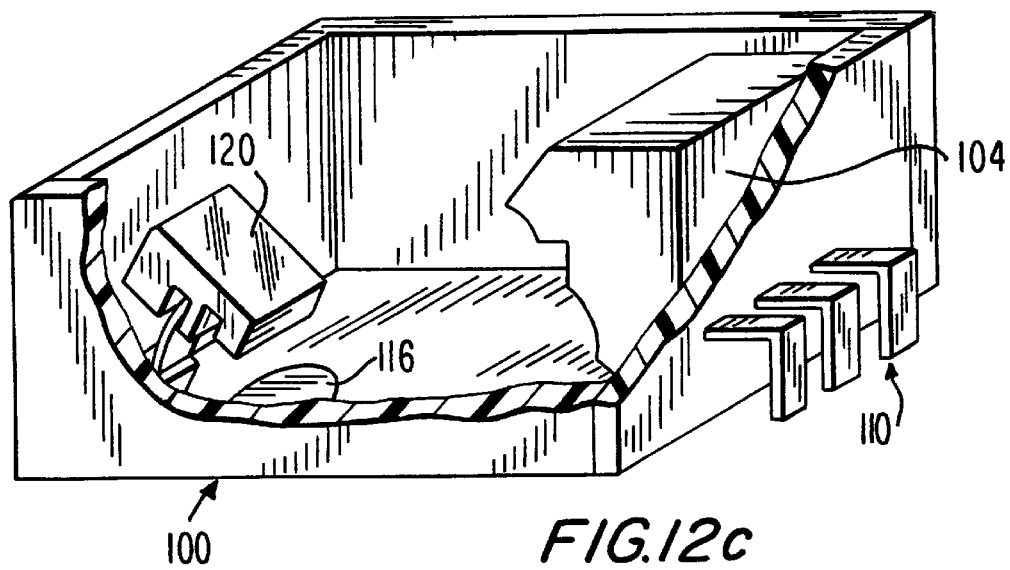
FIG. 12c shows an alternative mounting to that shown in FIG. 12b.

FIGS. 12a to 12c show a scan engine designated generally 100 in plan view and having in the preferred version dimension 0.55 inches by 0.64 inches (height 0.26 inches). The basic components shown include a laser 102, a laser holder/lens and collection mirror 104, a power/control laser flex 106, a processor such as an ASIC 108, a connector 110, a filter 112, a photodiode 114, a coil 116, a cooperating permanent magnet 118 mounted on a scan mirror 120, a chassis 122 for holding the scan mirror 120 and a Mylar coupling 124 between the scan mirror 120 and the chassis 122. Also provided on the scan mirror is a drop protection pin 126.

Operation of the engine is controlled by the ASIC 108. The laser 102 is powered by flex 106 and generates a scanning beam 103 which is reflected off a mirror surface 121 of the scan mirror 120. The reflected beam exits the scanner for example through a scanner window (not shown).

The scan mirror oscillates about the chassis 122 via the resilient, flexible Mylar coupling 124. Oscillation is provided by an alternating field coil 116 interacting with a permanent magnet 118 provided on the scan mirror 120. The scan engine 100 is a retroreflective arrangement such that the scanning beam reflected from an item to be scanned is redirected onto scan mirror 120 and then onto a collection mirror surface 104a on laser holder 104. The collected light passes through a filter 112 to a photodiode 114. The response of the photodiode 114 is interpreted by the ASIC 108 or passed on to downstream processing means to decode the information contained in the reflected beam.

Miniaturization is achieved in various ways. The laser holder 104 is a single component in one piece also serving as a collection mirror and a laser lens. The collection mirror is formed on an external surface 104a and the laser lens is formed on an internal surface 104b facing the laser 102. A portion of the face of the collection mirror 104a is normal to the laser beam allowing direct transmission of the laser beam output from the laser 102 via the lens 104b. The effective aperture formed by the normal portion of the collection mirror 104a is referenced 105 and allows the use of a very small aperture in the region of 10 to 20 mil in the plane of the page. As a result the focusing process is greatly simplified and adjustment is not required.

Because of the provision of the circuit board 109 to which the ASIC 108 and connector 110 are mounted in relation to the laser and scan mirror, the coil 116 driving the scan mirror 120 and the photodiode 114 can be mounted on the circuit board allowing low cost surface mounting thereof. The chassis 122 can be of plastic and thus effectively serve also as a motor frame. The general miniaturization of the components by using the features described above in conjunction with a suitable pin connector 110 allows the entire scan engine 100 to be plugged into a terminal circuit board as a component. Accordingly the entire arrangement is fully modular and can be incorporated into other arrangements as desired.

Figure 13:
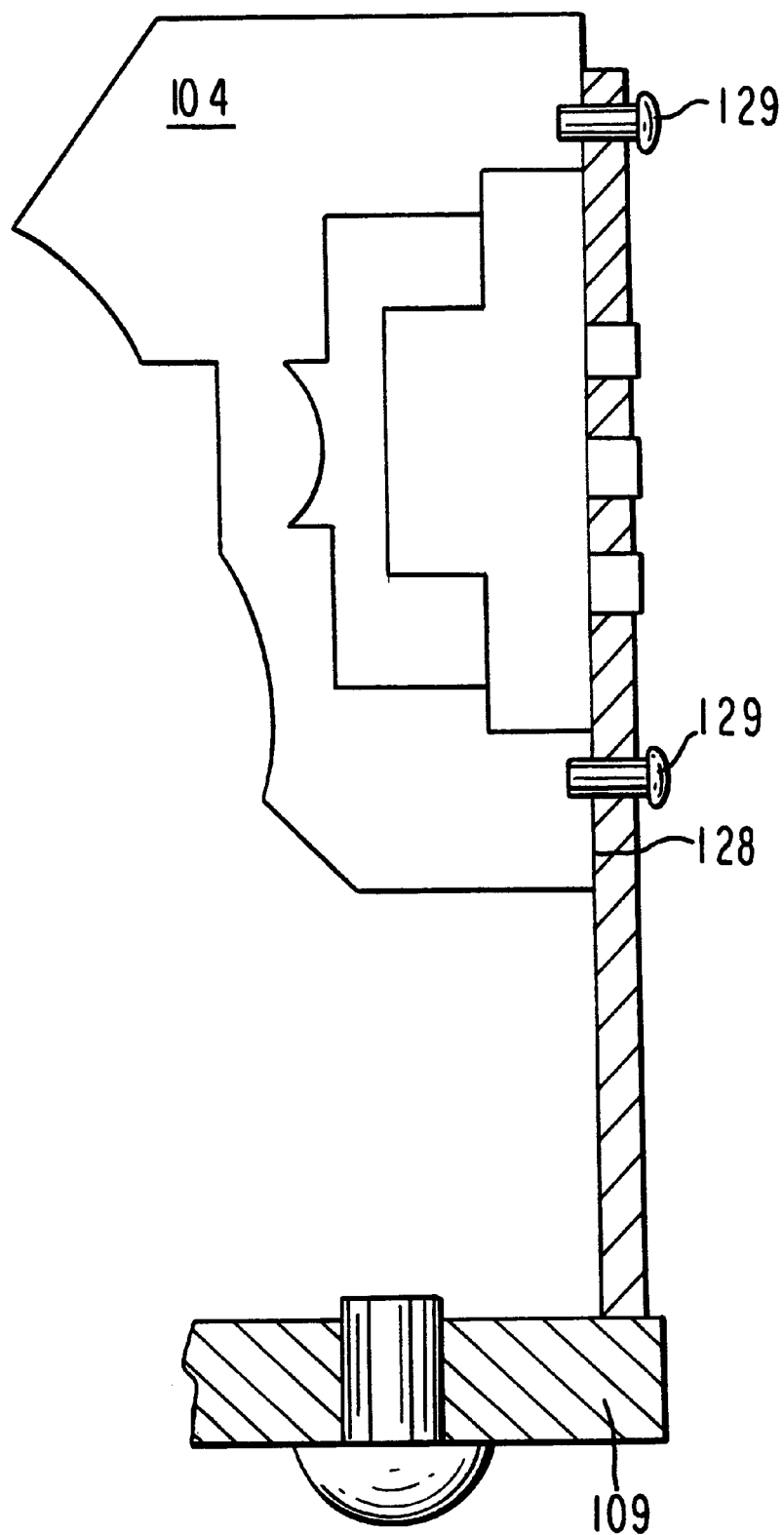
FIG. 13 is a partial view showing a variant on the arrangement of FIG. 12.

In the arrangement shown, the laser 102 is press-fitted into the lens block 104. In a preferred variant, the laser flex 106 is replaced by a laser flex board 128 pinned by crushed plastic pins to the laser holder 104 and urging the laser into contact with the laser holder 104. This detail is shown in FIG. 13. The laser flex board 128 is butt-soldered or otherwise suitably attached to the circuit board 109. Laser holding pins 129 urge the laser flex board 128 against the laser holder 104.

As a result a scan engine with minimum height (in the order of a quarter of an inch), small size and low weight is achieved, with attendant cost benefits. It has be found that the collection area of the collection mirror 104a can be reduced down to 25% of conventional systems and still have adequate performance—up to 29 inches on 55 mil type bar codes and the ability to read 25% low contrast. The laser holder 104 comprises a single plastic part as collection mirror, laser lens and aperture and laser holder, the laser being pressed into the part as discussed above relying on mechanical tolerances without any additional focusing requirements. This is achieved for a laser chip/lens position accuracy of +/−0.005 inches. Performance can be maintained despite these tolerances by using a short focal length lens in the region of 3 mm and a small aperture in the region of 0.020 inches. No heat sink is required for the laser. A suitable laser component is that sold by the firm Sony (TM) under the code 1121. In view of the likely uses of the system, preferably the scanning range is increased in relation to high densities near the scanner and performance is decreased for distant symbols to be read as discussed in more detail below.

FIG. 12b shows how the scan engine is mounted. In one variant the scan engine 100 is mounted to a printed circuit board, for example being surface-mounted on a "through hole" connector 110. The connector 110 incorporates the regular scan engine connections including power, ground, DBP, SOS, laser on and scanner on.

In an alternative arrangement the board 102 comprises a terminal circuit board carrying some of the scan engine control functions. In this case the connector 110 can include power, ground, laser and laser photodiode connection, scan element coil connection and photodiode signal out (amplified or raw signal). Accordingly far more processing is carried out on the terminal circuit board itself allowing the scanner size to be minimized because of the reduction of electrical functions carried within. This arrangement is shown in more detail in FIG. 12c in which it can be seen that the components in the scan engine 100 itself are reduced to a minimum. This system allows a scan module subassembly, the connector being designed to connect to the original equipment manufacturer (OEM) customer's PC board, motor control and drive electronics being implemented, and customized, thereon.

The modular form of the reader component can comprise a board with the reader module at one end and a connector at the other end allowing the board to be mounted in any desired housing and connected as appropriate, for example to a gun-shaped housing, a flat terminal-type housing or a cigar-shaped housing such as that shown in FIG. 14b and discussed below. As a result the modular component can be easily adapted and incorporated into any desired housing configuration with a maximum of simplicity and speed.

Figure 14A:
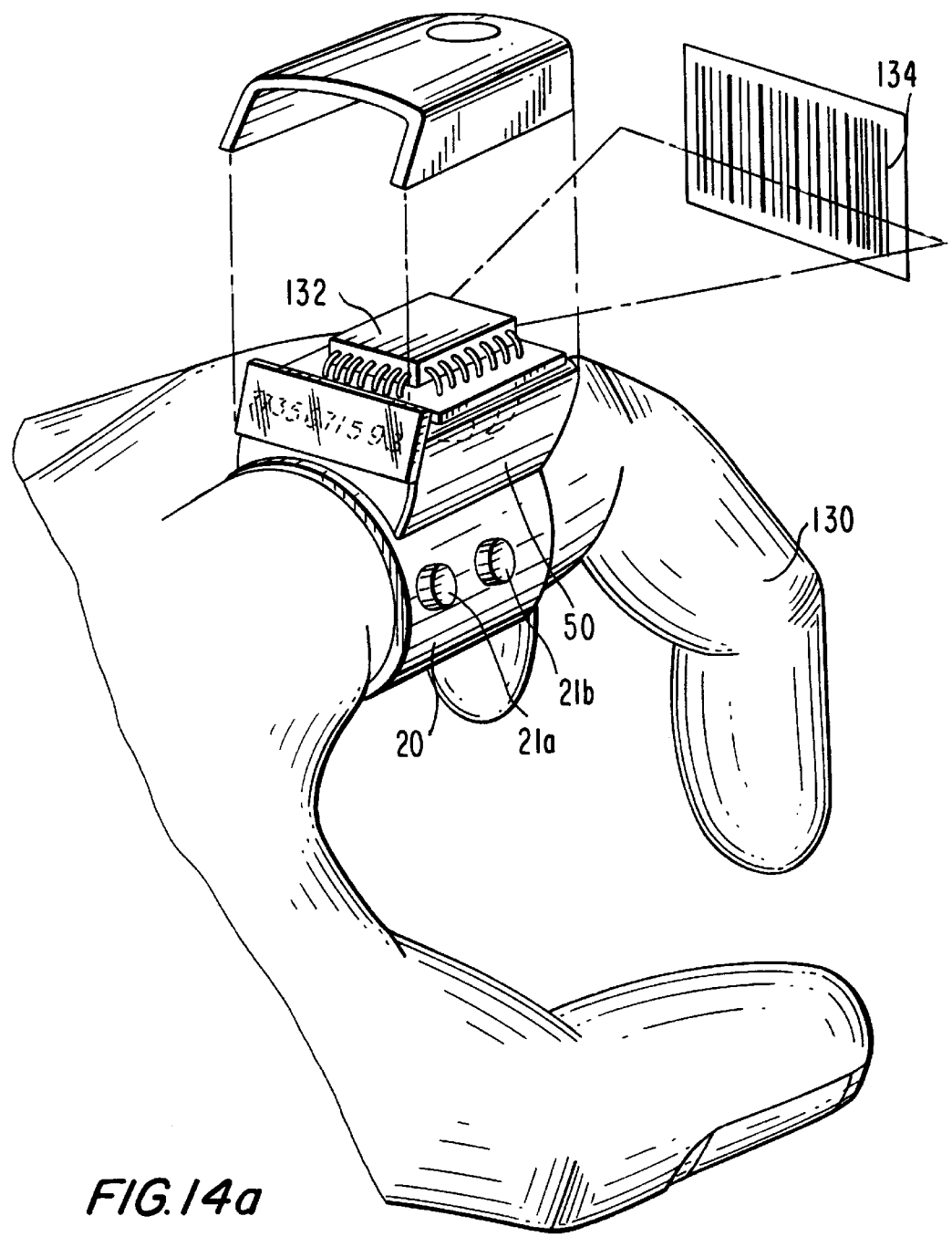
FIG. 14a shows a scanner on a chip according to the present invention.

The invention discussed in relation to FIGS. 12a to 12c and 13 can be embodied in an exploded view of a scanner on a chip as shown in FIG. 14a. A ring scanner 20, 50 for example of the type discussed in more detail above is mounted on the user's index finger 130. The upper portion of the scanner 50 is shown lifted away from the remainder of the scanner. As can be seen the scanner can be considered to be formed on a chip 132 allowing linear reading of a bar code symbol 134 in the manner discussed above. A scanner on a chip is discussed generally in application Ser. No. 08/111,532 incorporated herein by reference. It will be appreciated that the incorporation of such technology in the context of a finger mounted ring application allows greatly enhanced benefits in particular in relation to weight reduction, efficiency and user convenience. In particular such a system includes a micro machined mirror, a laser diode, and a detector mounted on a single substrate or several connected substrates allowing optimum miniaturization. The ring scanner terminal 20,50 further incorporates user controls, such as keys or buttons shown at 21a, 21b, positioned so as to be actuable by the user's thumb to control, for example, scanner on/off.

Figure 14B:
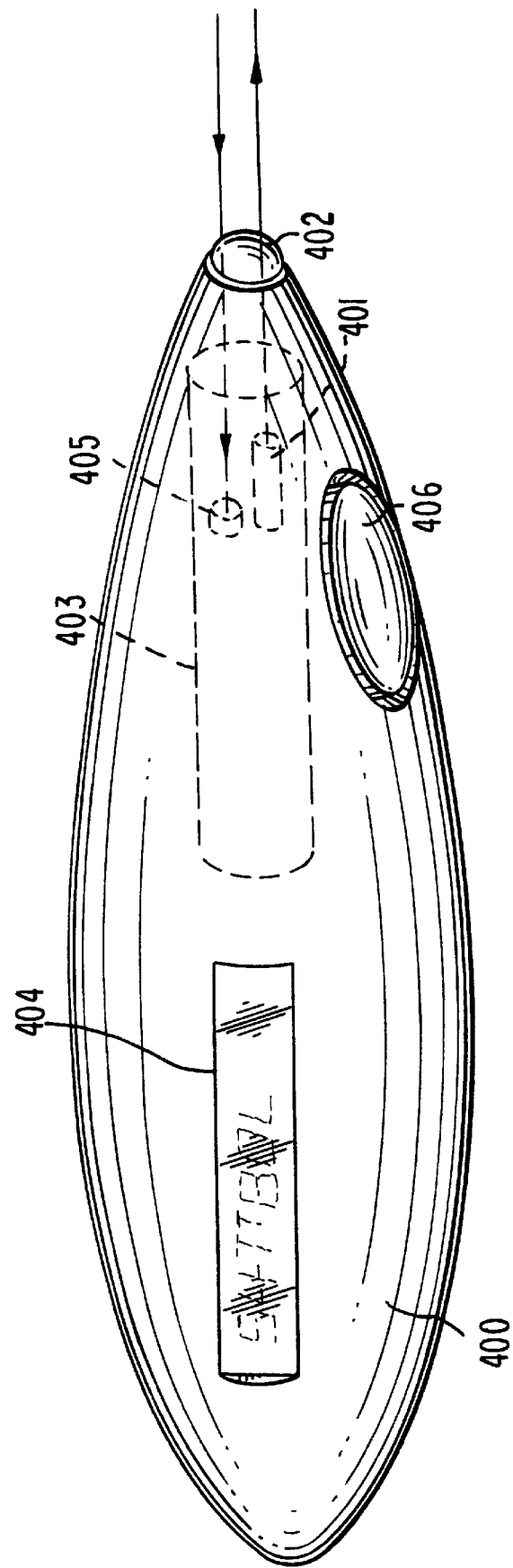
FIG. 14b shows an alternative scanner configuration.

FIG. 14b shows an alternative scanner configuration comprising a cigar-shaped housing 400 having a scanning or reading beam window at one end 402. The terminal includes a one line display 404 and a control trigger button 406. The trigger button 406 is flush-mounted with the housing 400 such that it is ergonomically and visually acceptable. As can be seen from FIG. 14b the housing 400 further includes a cylindrically-shaped scan module 403 including a reading beam generator 401 and a reading beam detector 405. The provision of a reader module 403 in this configuration makes it particularly adaptable for incorporation in scan modules such as the cigar-shaped housing 400.

Preferably the scanner of the present invention operates in dual mode configuration—either long range or short range. Although the principles of such a scanner are discussed below in the context of the present invention, it will be seen that the principles can in fact be applied to any suitable scanner or engine.

According to one known scanning system, and as shown in the flow chart of FIG. 15, a scanner can emit a narrow spot-like beam in its "default" state (step 140). On detection 142 of a bar code symbol or other readable indicia the narrow spotting beam expands into a long scanning line 144. Detection of the bar code symbol can be achieved, for example, when the reflected narrow beam displays an essentially regular pattern of reflected and non-reflected elements suggesting the presence of a bar code symbol.

The scanner is a dual mode scanner allowing long range and short range operation—the mechanics thereof are discussed briefly below. In the default range the scanner commences scanning in long range mode. The scanner monitors whether a bar code is detected at that range (146). If yes the bar code symbol is decoded in the conventional manner at step 148. If, after a time out period of any suitable duration no viable bar code is detected (150) the scanner automatically shifts to short range mode at 152. If a viable bar code is detected then it is decoded in a conventional manner at 148.

Figure 16A:
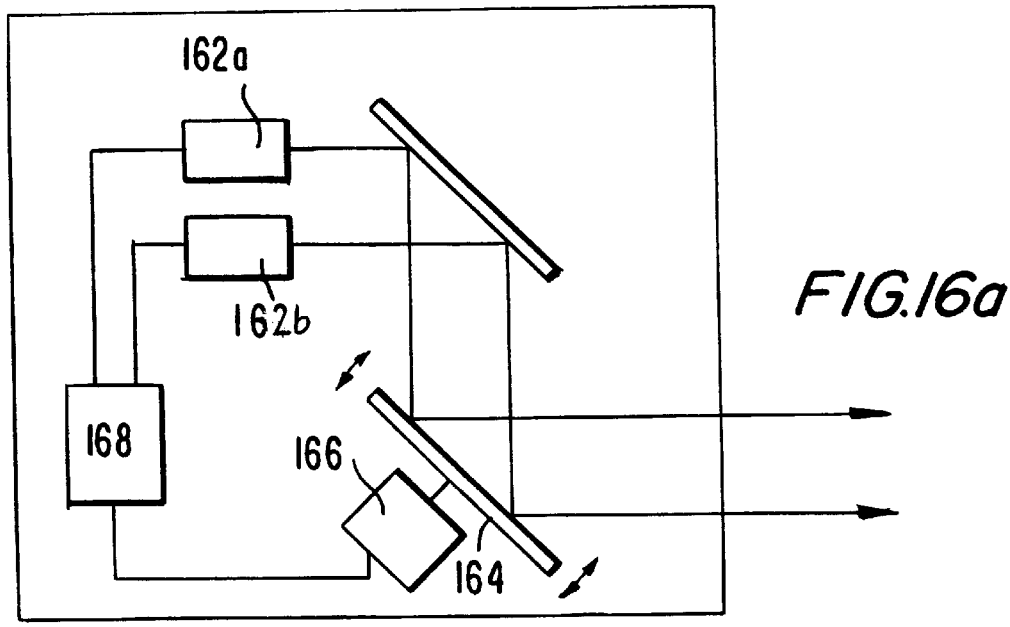
FIG. 16a shows one embodiment of a dual mode scanner.
Figure 16B:
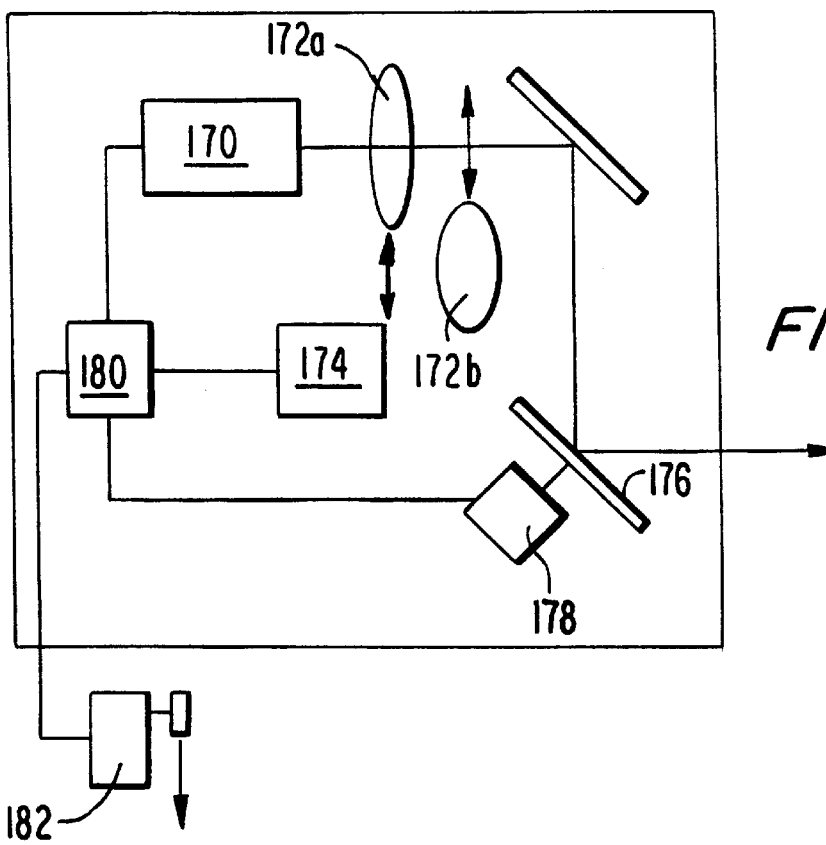
FIG. 16b shows an alternative embodiment of a dual mode scanner.

FIGS. 16a and 16b show two possible implementations allowing dual mode of the scanner. In FIG. 16a two lasers are provided, 162a and 162b. The first of those lasers can be a long range laser and the second a short range laser. The beam emitted by each laser is reflected off a scan mirror 164 driven by a scan drive 166 onto a suitable target (not shown). The lasers 162a, 162b and the scan drive 166 are controlled by a suitable processor 168. The processor is also connected to a detector (not shown). In the first instance the processor deactivates the scan drive 166 and activates long range scanner 162a such that a long range, narrow spot beam is emitted. When a bar code is detected processor 168 activates the scan drive 166 which oscillates scan mirror 164 giving rise to a far range scan line at the target. If during the time out period no read is indicated at the detector the processor switches the far range laser 162a to off and the near range laser 162b to on. The processor decodes any bar code read or transfers the detected data to a suitable decoding module as appropriate.

Referring to FIG. 16b an alternative arrangement is shown. In this case a single laser 170 is provided together with dual optics systems 172a, 172b. Each of the optics systems is drivable by a drive shown schematically at 174 into and out of the path of the laser beam emitted by laser 170. The emitted laser beam is reflected from a scan mirror 176 driven by scan drive 178. Operation of the laser 172, scan drive 178 and lens drive 174 is controlled by a processor 180.

Operation of the embodiment shown in FIG. 16b is the same as that shown for FIG. 16a except that instead of switching between far range and near range lasers the processor 180 switches between far range and near range optics systems 172a, 172b. Also shown schematically in FIG. 16b but equally applicable to FIG. 16a, is a two position trigger 182. In practice this can be formed by a toggle arrangement, or by a conventional trigger having for example a partially depressed and fully depressed position, or any other suitable means. The user operates the trigger such that, in the first position, the processor 168,180 deactivates the scan drive 166, 174 such that the system is in narrow spotting beam configuration, whilst in the second position, the scan drive 166, 178 is activated such that the scanner is in scanning beam configuration. This allows additional control by the user of the system.

A further implementation discussed in relation to FIG. 16a but equally applicable to FIG. 16b lies in the case where the user wishes to be able to select either long range mode or short range mode exclusively for a given application, or the specific predetermined condition shown in FIG. 15. User selection can be carried out by scanning a suitable bar code carrying the information at the outset. For example a printed sheet could be available to the user in a convenient location indicating which bar codes referred to long range, short range and normal operation respectively. Alternatively normal operation could be selected as a default if neither of long nor short range were specifically selected. For example where long range operation was selected, short range laser diode 162b could be permanently deactivated and long range laser diode 162a permanently activated until the condition was reset such that the scanner as a whole would operate in a long range mode only. In the variant of FIG. 16b the respective set of optics could be exclusively selected. The scanner would also be capable of being used as a spare unit for other short range or long range operations as well.

Further specific features of a ring scanner of the type discussed generally above will now be set out. The scanner/wrist module arrangement allows hands-free scanning whereby mounted on the user's finger and forearm, a scanner, integrated computer and radio are provided and form a complete productivity system which is both ergonomically desirable and allows highly enhanced performance. Scanning and computing do not interfere with the user's hands allowing handling of packages, products and materials. The system further benefits from the formability of radio communications. The ring scanner and wrist module are connected via an unobtrusive light weight cable.

The system allows a ring scanner of minimal weight and dimension yet with high reading capability even for poor quality bar code symbols. Its reduced dimensions mean that it is less susceptible to physical contact with objects which could otherwise be damaging, and the scanner module is preferably coated with a scratch-resistant material, in particular to protect the scanning window. The detent system described above preferably allows the ring scanner to break away from the mount at below 20 lbs/9 kg of pressure. The scan element described in detail above incorporating Mylar (TM) is of a very small dimension and light weight as well as being effectively frictionless such that there is no wear and tear. The system preferably incorporates a chargeable power pack for example mounted on the wrist module, and because of the miniaturisation of the components a single battery charge can last for an entire user shift. The system fits both left and right handed users and is of entirely adjustable size.

Preferably the wrist mounted computer includes a display/keyboard having a four or eight line by twenty character display and a twenty seven key alphanumeric keyboard positioned to allow both easy access by the user's other hand and easy viewing by the user. It will be seen that if the user is right handed it may be desirable to mount the scanner and computer on the user's left hand allowing ease of operation of the computer module.

The system data communications operate either by batch or on-line wireless communications through a suitable system such as that sold by Symbol Technologies under the trademark Spectrum 1 using radio frequency wireless LAN technology. The system is preferably DOS software compatible and thus cooperates with most existing systems. Preferably the memory capabilities are 640 KB RAM/512 KB non-volatile memory.

The wrist module can include a mount portion and a module portion comparable to that provided for the ring scanner and discussed in more detail below, allowing a given user to have a dedicated mount but interchangeable computer. The wrist module is also lightweight and has low power requirements allowing a rechargeable battery to fulfil the user's requirements. A cradle of suitable dimension can be provided for battery charging and downloading of information either as a backup to information transmitted by a wireless data transmission, or for information that does not require instantaneous transmission. It will be seen that the ring scanner can be used in conjunction with alternative modules, for example a belt-mounted module or any module mounted on the user's person with equal advantages to the ring scanner itself.

The system can be used in warehouse and distribution environments, for tracking goods in shipping and receiving, order picking, stock pulling and putting or cross stop transfers and inventory/cycle counts.

Alternatively the system can be used by retailers—for point of sale applications, shelf price audits, store transfers and inventory management.

Yet further applications are envisaged for freight companies, airlines, parcel and package delivery companies and manufacturers. All of these users would benefit from the ease and simplicity of operation, comfort and safety, greatly improved productivity, strength and durability, wireless connections to terminals and host and capability for developments towards existing applications provided by the present invention. It will be appreciated that, where appropriate, all of the features discussed above can be applied to any suitable scanner system.

In addition many variants can be envisaged to the basic system discussed above. Variants can improve the comfort of the user or decrease discomfort if the ring scanner is accidentally struck. A disposable or reusable pad can be wrapped half way around the finger for cushioning and firmness. Such a pad can be of rubber or other high friction or sticky material. The mount itself or a finger contacting portion of the mount or other portion of the mount can be made from elastomeric material allowing increased flexibility and user comfort. The edges of the mount are shown as being rounded off; this decreases the chance of the user cutting or injuring himself if the mount is jarred.

Alternatively, or in addition the external portion of the carrier, or that portion which the user may otherwise injure himself on can be made of rubber or other suitably resilient/cushioning material.

In yet a further alternative the mount could incorporate some form of sticky material to adhere it to the user's finger; this would be a throw-away item in most configurations. The strap could be in the form of a watch buckle, for example an elastomeric buckled strap allowing simplified adjustment and user comfort. To further improve comfort, the strap which is shown as being made of fabric material could be made of thicker material in the same manner as a diver's watch.

The mount portion is preferably made of suitably soft and light material. The scanner portion itself could also be made of or covered by elastomeric material to decrease user discomfort if the scanner was jarred. In order to stop the scanner from injuring the user's other fingers, adjacent fingers could be provided with a finger guard—for example a pad on the adjacent fingers. The pad could be mounted using Velcro (TM) or any other suitable fastening material. A guard could be provided for the scanner as a whole, for example some form of cage. As mentioned above, the ring mount of the scanner itself could be mounted on a glove worn by the user which would decrease likelihood of injuries to the user's hand and allow enhanced distribution of the weight of the system. In addition to the two finger strap embodiment discussed above, the mount could be provided elsewhere on the user body—for example on the back of the hand, on the wrist or on a body or head mounted portion, as desired by the user although convenience and accuracy could be adversely affected.

Further modifications enhancing user comfort and safety will involve modifying the ring carrier structure. For example the ring could be rotated in the carrier so as to allow different pointing directions or to allow it to be moved into a less obstructing position. This could be achieved, for example, by breaking the mounting portion into two parts, a finger receiving portion and a scanner receiving portion rotatable on the finger receiving portion. Detent means could be provided allowing the scanner to be retained at the various desired predetermined rotation orientations.

To strengthen the attachment to the user's hand, a 540° wrap could be used going fully around the user's finger and once more over the top of the scanner or the mount. The buckle arrangement or, for example a Velcro (TM) arrangement, would be suitable for this.

Rather than sliding the ring onto a mount it could be slid into a molded mount and enclosed therein. The desired degree of ruggedness would thus be determined by the mount rather than the scanner portion allowing simplification of manufacture, a single model scanner portion and a range of mount configurations having different strengths.

Providing an elongate mount portion extending, for example the length of the user's finger or from the user's knuckle to the user's wrist, would allow the scanner to be placed at any desired position along the mount—for example slidable therealong and held in a desired position by detent means. As a result the position of the scanner could be carefully selected, and the scanner could be moved out of the way if the user desired to access a point of limited availability which might otherwise be obstructed by the scanner portion. The mount could be configured such that the scanner portion was off-set from the vertical position on the user's finger, allowing the scanner portion to be moved away from an adjacent finger, once again decreasing the risk of the user injuring an adjacent finger if the scanner portion was knocked. A flexible mount extending from the wrist module could be provided on which the scanner was provided such that weight would not have to be carried by the user's finger. In that case an external switch located other than on the scanner could be provided, for example on the wrist module, or held in the user's other hand.

Many variations on the trigger design can be envisaged as well. For example the mount could include no trigger at all—the scanner could be permanently on or activated by an external trigger as mentioned above. In place of a trigger a switch could be provided actuable by the user's thumb or otherwise actuable. This would be of particular advantage in allowing the user to select different scanning options. Instead of providing a mount and, as separate components thereto, a trigger and a strap, a single moulded or extruded mount could be provided with integral trigger and strap, thus simplifying the manufacturing process and strengthening the element as a whole.

Although the trigger shown in the preferred embodiments above is permanently attached, it could be releasably attached or otherwise interchangeable, for example using a snap-on configuration. In that case, different triggers could be used for different desired uses, or different mounting configurations dependent on the user's requirements. As an alternative to the mechanical/electrical switch shown, various other different types of switches could be incorporated, such as an acoustical switch using a clicker in the user's other hand, an acceleration switch, a thermal touch switch (capacitive and thermal), a gravity switch, a laser gun site switch, an optical/IR switch, or a read switch with a magnet on the user's thumb to activate it. As mentioned above the system can use a conventional watch-like strap arrangement including a watch pin. Alternatively the watch pin can be combined into the buckle or replaced with a solid piece. In that case the break-away capability of the system could be incorporated in the strap.

According to another aspect of the invention there is provided an improved electrical interface arrangement. Such an interface can be formed, for example, between the scanner and wrist module described in more detail above. Alternatively, as will be clear from the discussion, the interface can be used for connection between a scanner and any other suitable module—for example where the scanner components are mounted on a single board or chip as modular components the interface can be used to connect the modular components to a control system allowing ease of connection and interchangeability.

Preferably the interface is an eight pin interface and the pins can be designated as shown in table 1 below.

| | Pin Name | Description |
| --- | --- | --- |
| 1 | Power | Supplies power to the engine 5 VDC ±10%; approx 60 mA |
| 2 | Range Limiter | When low, scanner range is reduced. When high, or not connected, scanner operates with full performance. |
| 3 | Laser Enable | When low, the laser is enabled only if pin 4 is also low. Laser is off if high or not connected. |
| 4 | Scan Enable | When low, the scan motor runs and all circuitry is activated. |
| 5 | Digitized Bar Pattern | This output represents the widths of the bars and spaces in the symbol being scanned. An internal 10K ohm pull-up resistor is used. Valid DBP data should not be expected for about 55 msec after both Laser Enable and Scan Enable are active. High = bar, Low = space |

-continued

| Pin | Name | Description |
|---|---|---|
| 6 | Start of Scan | This output changes from high to low, or low to high, when the scanned laser changes its direction of travel at either end of the scan line. An internal 10K ohm pull-up resistor is used. |
| 7,8 | Gnd | Ground |

Of course an interface can incorporate any selection of the pin functions set out above and benefit from the resultant advantages discussed in more detail below.

Figure 17:
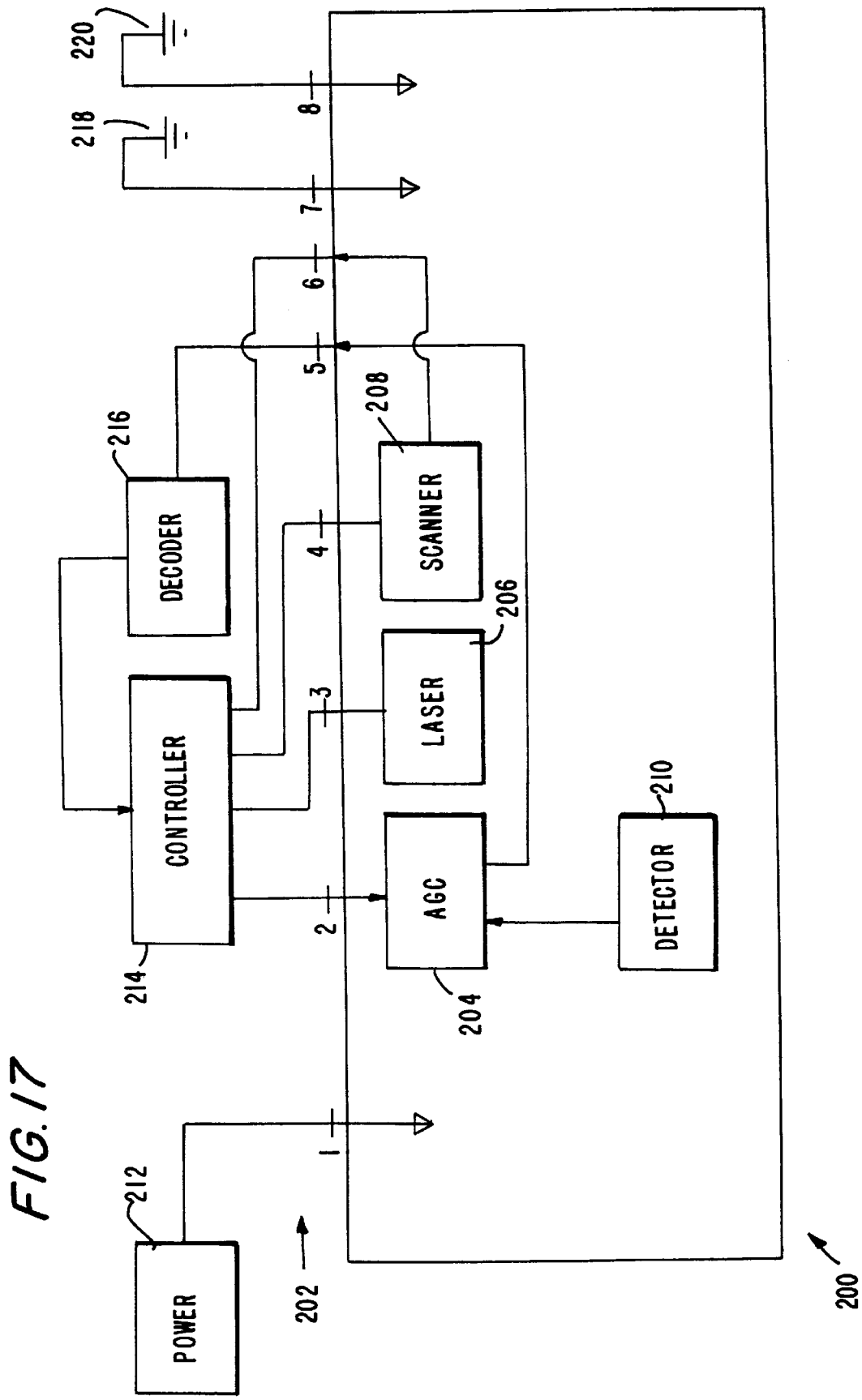
FIG. 17 is a block diagram of an electrical interface for a scanner.

The principal components of the arrangement are shown in FIG. 17. A scanner module is designated generally 200 and includes an interface designated generally 202 comprising pins 1 to 8. Internally the scanner module includes automatic gain control 204, a laser 206, a scanner 208 and a detector 210. External to the scanner module 200 are a power module 212, a controller (for example a CPU) 214, a decoder 216 and ground connections 218,220.

Pin number 1 supplies power to the engine in a conventional manner, for example at 5 VDC and approximately 60 mA.

Pin number 2 comprises a range limiter pin providing an operating mode in which the overall working range of the scanner is reduced. This mode is particularly useful when the engine is operating without the benefit of manual triggering. In those circumstances the scanner will scan continuously and it is important to reduce the scanner's sensitivity to the point where the scanner will not resolve dirt, woodgrain or text from the base of, for example, a stand holding the scanner or a countertop at which the scanner is aimed.

The range limiter mode is controlled by applying a high or low level to pin 2 of the interface connector 202. The level is applied by controller 214. The scanner module 200 includes an automatic gain control circuit 204 that regulates the amplitude of the signal to the decoder/digitizer 216 via pin 5. Accordingly the signal from detector 210 passes through the AGC unit 204 prior to decoding/digitizing at 216.

When the controller 214 sets interface pin 2 high the range is not limited and the AGC 204 has sufficient dynamic range to provide the signal within the required range for the digitizer/decoder 216 to function. This is achieved even when indicia being read are of low contrast or far away from the scanner.

When the controller 214 sets interface pin 2 low the maximum gain of AGC unit 204 is limited such that distant symbols or non-true symbols cannot be read. The gain can be varied below this limit and in particular reduced to enable reading of indicia close to the scanner, however.

A further result of holding interface pin 2 low, in addition to limiting the working range on good quality symbols, is that the scanner's performance on low quality symbols will also be reduced. Accordingly the range limiter mode can be used to determine the possible presence of a symbol in the scan field. This is carried out in conjunction with the decoder 216 which distinguishes between the presence of a bar code symbol and the absence of a bar code symbol. As soon as a valid bar code symbol is detected, according to any suitable detection algorithm, interface pin 2 goes high restoring the scanner to maximum performance during the actual decode attempt. As a result the scanner operates in a limited range mode (pin 2 low) reducing power consumption and ensuring that non-true symbols such as dirt, woodgrain, and so forth are not resolved. Only when a true bar code symbol is detected does the system switch to full range mode allowing a decode to take place.

Interface pin 3 is also controlled by controller 214 and controls whether the laser 206 is on or off. This is carried out in conjunction with a status check on the operation of the scanner 208. Interface pin 4, also controlled by the controller 214, determines whether the scanner 208 is on or off. When interface pin 4 is low the scan motor runs and all the circuitry is activated. When interface pin 4 is high the scanner 208 is off. Returning to interface pin 3, when interface pin 3 is high the laser is off, whereas when interface pin 3 is low the laser is on but only if interface pin 4 is also low such that the scanner 208 is also on. As a result the laser can only be switched on if the scanner 208 is scanning.

The laser enable control (interface pin 3) can be used for several purposes. Where the decoder 216 includes the appropriate software, the scanner module 200 can operate in an automatic triggering mode. In this mode, for example, the laser 206 is turned on for only one out of every three or four scans until the decoder 216 determines (by examining the digitized bar pattern output from interface pin 5) that a true bar code symbol might be present. The decoder 216 in conjunction with the controller 214 then turns on the laser 206 permanently by setting interface pin 3 appropriately until the symbol is decoded by decoder 216. Once the symbol is decoded the laser is once again turned on for only one scan out of three or four. This system reduces laser-on time, reducing power consumption and prolonging laser life. The system can be used on conjunction with the range limiter mode discussed above, controlled by operation of interface pin 2, to minimise unintentional triggering. For example, the laser is only switched to continuous scanning rather than every three or four scans if the decoder 216 detects a true bar code symbol with the AGC 204 set to short range gain limit (pin 2 low) only. This cooperating arrangement allows yet further reduction in power consumption.

A further use of the laser enable control at interface pin 3 is envisaged where it is desired to scan a selected bar code symbol which has others closely spaced around. In this mode the controller 214 enables the laser only in the center of the scan, effectively narrowing the scan angle to prevent accidental reading of the wrong symbol. This mode can be synchronized with the scanner 206 by control of the scan output interface pin 6 which changes state each time the scanned laser changes its direction of travel at either end of the scan line.

Various advantages are realized by turning the laser off for part of every scan or for selected entire scans. In particular these modes can significantly reduce power consumption bearing in mind that the laser uses approximately 80% of the power consumed by the scanner 200. When the laser is off, in its preferred embodiment the unit consumes approximately 13 mA assuming that the scan motor is running (interface pin 4 low—enable scan). It will be seen that this power consumption is considerably lower than the maximum power supply of approximately 60 mA.

The output at interface pin 5 represents the widths of bars and spaces in the symbol being scanned, a high state representing a bar and a low state representing a space. When the laser is off and the scan enable interface pin 4 is low, interface pin 5 can be either high or low. When both laser enable and scan enable are active, valid data may not be achieved during the brief start-up phase—for example 55 msec in which case data received during this period can be ignored.

When interface pin 4 is held low, the scanner 208 is enabled and transitions from high to low and vice versa occur at the scan output interface pin 6. Where minimum power consumption is not required, the scan enable pin 4 can be held low (enable scan) at all times. It will be appreciated that if the laser 206 is then enabled via pin 3 when reading is desired, more rapid scanning response can be obtained generally as it is not necessary to wait for the motor to start up. In these circumstances the "ignore data" period at interface pin 5 can be disabled.

Interface pin 6 can further be used, if desired, to synchronize laser turn-on with the beginning of a scan.

Figure 18:
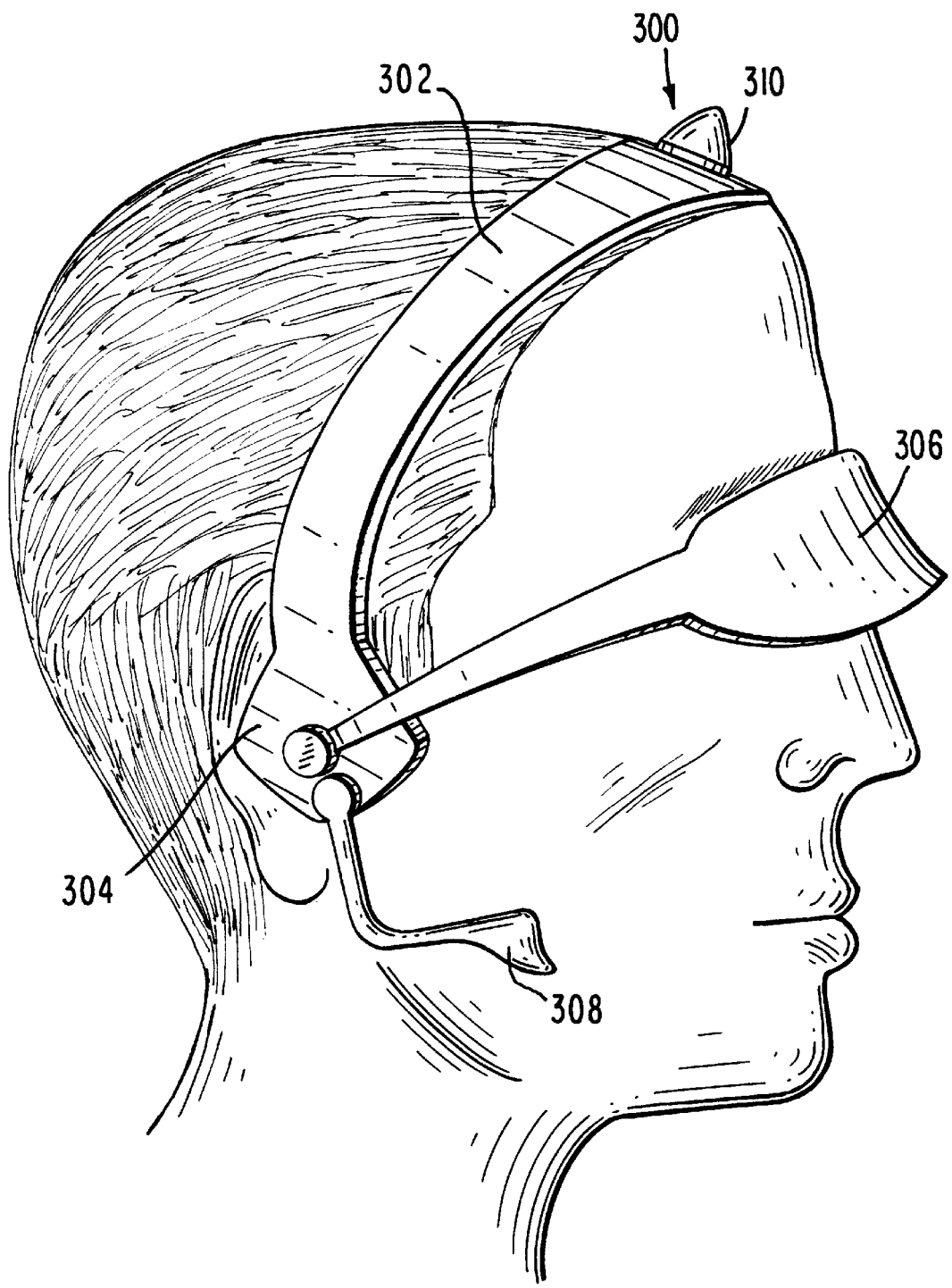
FIG. 18 is a schematic view of a headset according to the present invention.
Figure 19:
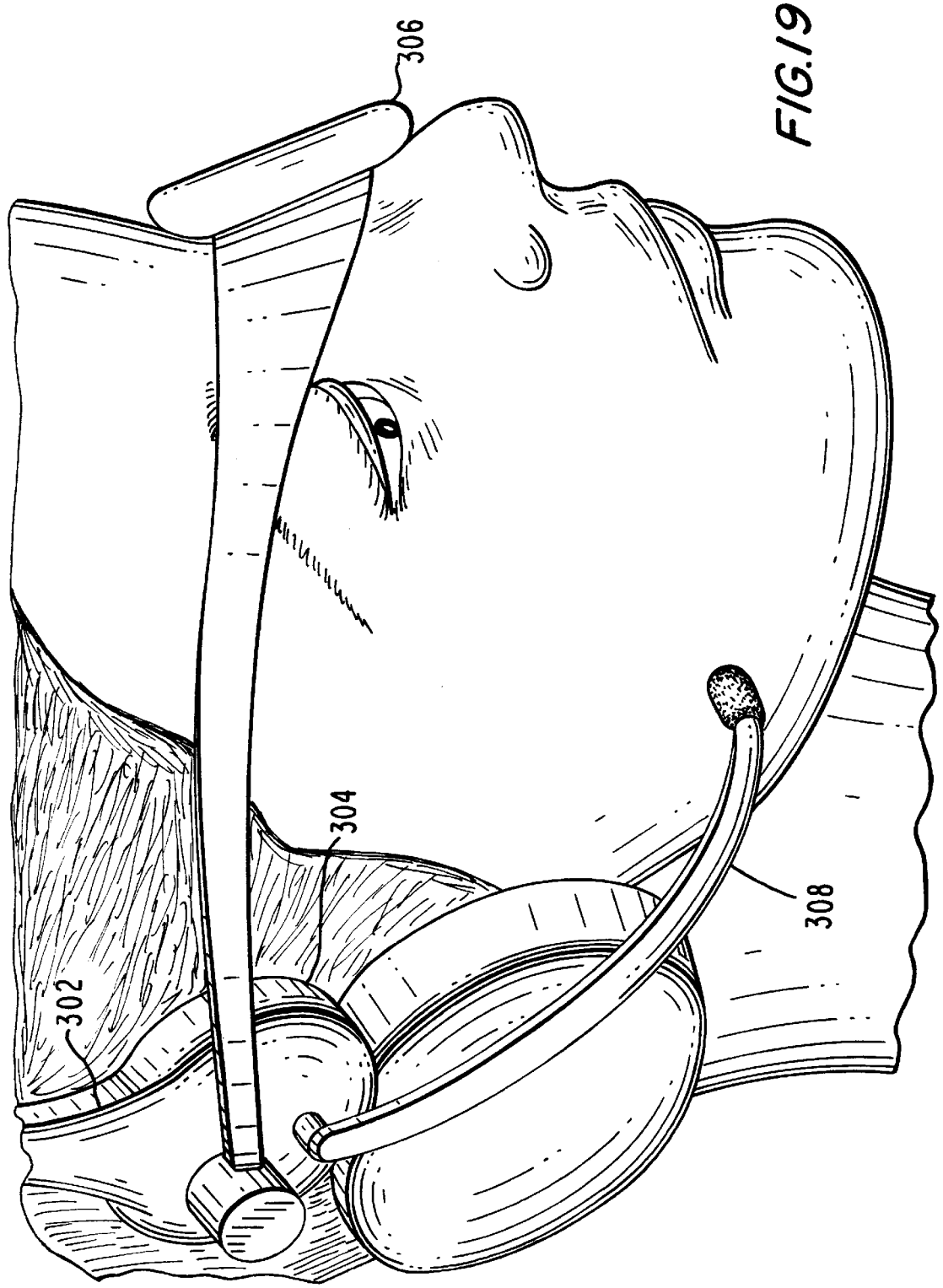
FIG. 19 is a further view of a headset of the type shown in FIG. 18.

According to another aspect of the invention there is provided an improved communications head set allowing optimum hands-free use by the user. One embodiment of the headset is shown in FIGS. 18 and 19.

It is desired to introduce "wearable" computer/communication systems for users who are not desk bound and are highly mobile/require use of their hands as far as possible. Indeed the system can also be used for desk bound workers who require additional flexibility and mobility. Suitable workers include retail workers, warehouse workers, medical workers, package delivery workers, mechanics and so forth. All of these workers require the use of both hands or mobile/portable equipment to perform their job, but also require information and/or the use of their hands to perform the job efficiently and effectively. Current systems such as instruction books, laptops, scanning guns, clip boards, cell phones, whilst of great assistance to these workers are still susceptible to improvement.

The invention includes a head set designated generally 300 comprising a support portion 302 adapted to be worn over the user's head and supporting an ear piece 304, an eye piece 306 and a microphone 308. The eye piece 306 is pivotable on the support 302 or ear piece 304 from a position in front of the user's eye to position out of the user's line of view. Preferably the eye piece is a monocle although dual eye pieces can be used if desired either both extending from one side, or each extending from the respective side of the support 302 or ear piece 304. Similarly the microphone 308 can be pivoted into an operable and inoperable position.

The headset 300 further includes an antenna 310 allowing communication through, for example, a wireless local area network between the user and a remote control point. Wireless communication technology is well known and the basic components will be apparent to the skilled person. In particular the headset will communication via, for example radio communication or infrared communication with one or more access points to a host, communication with the access points following any suitable communications protocol, and the conditions for a roaming headset to link up to a given access point following any desired system.

Through the wireless local area network the headset can provide a telephony feature allowing voice communication, the wearer receiving communications through ear piece 304 and issuing communications via microphone 308.

Preferably the eye piece 306 comprises a modular head-mounted LCD display which can be plugged into the headset or remain integral with the headset and can be operated by voice commands. When a command is issued the LCD display displays relevant information to the user, for example inventory of store goods, repair manual, delivery routes and so forth.

In addition the head set 300 can be provided with a global positioning system GPS capability either using antenna 310 or a suitable additional lens preferably located at the top of the headset so as to be in the "line of sight" with GPS satellites. The system can be utilised when workers are in the field and need to be located by the control or host office to evaluate their location relevant to a next desired job location. For example this would be particularly relevant to package delivery companies, surveyors and so forth.

The headset 300 can be modular such that only the desired components are included in a given headset. As a result the headset can be tailored to the requirements of a particular user.

In summary the headset includes a rotating pivot for a heads-up display (eye piece) 306 located off the ear piece 304 and the headset 300, base unit telephony and optional GPS. Preferably the telephony feature is provided by a wireless local area network. The heads-up display preferably comprises a head-mounted LCD display in the form of a monocle supplying screen-based information, which can be pivoted out of the line of sight (above the head) when not needed. The image on the screen can be changed via voice command received at the microphone 308.

It will be appreciated that any of the features discussed in relation to a particular embodiment above can be equally well incorporated, as appropriate, into any of the other embodiments discussed. In particular the interface can be incorporated in a ring scanner or in any suitable scan engine. The ring scanner can be used in conjunction with, and controlled by, the headset and so forth.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

What is claimed is:

1. An interface for electro-mechanically installing a scan module in a system for electro-optically reading bar code symbols, the scan module including a laser for directing a laser beam at a symbol for reflection therefrom, a detector having a field of view and operative for detecting light reflected off the symbol and for generating an electrical signal corresponding to the reflected light, a gain controller for regulating the electrical signal from the detector to generate a regulated signal, and a scanner for scanning at least one of the laser beam and the field of view, the system including a signal processor for processing the regulated signal, the interface comprising:

a connector having a first connector part connected to the scan module, and a second connector part connected to the system, the connector parts being detachable for removal of the scan module from the system, the connector parts being connected upon installation of the scan module in the system, the connector having a plurality of individual dedicated terminals including:

a) a power terminal for supplying electrical power from the system to the scan module;

b) a ground terminal for providing a system ground for the scan module;

c) a laser enable terminal for conducting a laser enable signal from the system to the laser in a laser enable state to energize the laser;

d) a scan enable terminal for conducting a scan enable signal from the system to the scanner in a scan enable state to actuate the scanner;

e) a start of scan terminal for conducting a start of scan signal from the system to the scanner to indicate direction of scanning across the symbol;

f) a signal output terminal for conducting the regulated signal from the gain controller to the signal processor for processing; and g) a range terminal for conducting a short range signal having a low state from the system to the gain controller to enable the scan module to scan a close-in symbol at a short distance away from the scan module, and for conducting a long range signal having a high state from the system to the gain controller to enable the scan module to scan a far-out symbol at a long distance, greater than said short distance, away from the scan module.

2. The interface of claim 1, wherein the terminals include another ground terminal, and wherein the connector consists of eight terminals.

3. The interface of claim 1, wherein the gain controller includes a gain control circuit connected to a system controller via the range terminal, and also connected to the signal processor via the signal output terminal; and wherein the detector is connected to the gain control circuit.

4. The interface of claim 3, wherein the system controller is a microprocessor for generating the short and the long range signals, and wherein the gain control circuit is an automatic gain control circuit for regulating the amplitude of the electrical signal from the detector prior to being conducted to the signal processor.

5. The interface of claim 4, wherein the signal processor is a decoder.

6. The interface of claim 4, wherein the microprocessor generates the short range signal in an operational mode in which the system includes a housing mounted on a stand, and generates the long range signal in a different operational mode in which the system is mounted in a hand-held housing.

7. The interface of claim 1, wherein the scan module is mounted on a printed circuit board, and wherein the first connector part is mounted on the board.

8. A method of electro-mechanically interfacing a scan module in a system for electro-optically reading bar code symbols, the scan module including a laser for directing a laser beam at a symbol for reflection therefrom, a detector having a field of view and operative for detecting light reflected off the symbol and for generating an electrical signal corresponding to the reflected light, a gain controller for regulating the electrical signal from the detector to generate a regulated signal, and a scanner for scanning at least one of the laser beam and the field of view, the system including a signal processor-for processing the regulated signal, the method comprising the steps of:

A) connecting a first connector part of a connector to the scan module;

B) connecting a second connector part of the connector to the system;

C) providing a plurality of individual dedicated terminals on the connector, including
   a) a power terminal for supplying electrical power from the system to the scan module;
   b) a ground terminal for providing a system ground for the scan module;
   c) a laser enable terminal for conducting a laser enable signal from the system to the laser in a laser enable state to energize the laser;
   d) a scan enable terminal for conducting a scan enable signal from the system to the scanner in a scan enable state to actuate the scanner;
   e) a start of scan terminal for conducting a start of scan signal from the system to the scanner to indicate direction of scanning across the symbol;
   f) a signal output terminal for conducting the regulated signal from the gain controller to the signal processor for processing; and
   g) a range terminal for conducting a short range signal having a low state from the system to the gain controller to enable the scan module to scan a close-in symbol at a short distance away from the scan module, and for conducting a long range signal having a high state from the system to the gain controller to enable the scan module to scan a far-out symbol at a long distance, greater than said short distance, away from the scan module;

D) detaching the connector parts for removal of the scan module from the system; and E) attaching the connector parts together for installation of the scan module in the system.

9. The method of claim 8, and further comprising the step of connecting the gain controller to a system controller via the range terminal, and the step of connecting the gain controller to the signal processor via the signal output terminal, and the step of connecting the detector to the gain controller.

10. The method of claim 9, and further comprising the step of conducting the short and long range signals from the system controller through the range terminal, and the step of conducting a regulated amplitude of the electrical signal from the detector through the signal output terminal prior to being conducted to the signal processor.

* * * * *